(12) United States Patent
Gaudette

(10) Patent No.: US 8,308,408 B2
(45) Date of Patent: Nov. 13, 2012

(54) APPARATUS, SYSTEMS AND METHODS FOR SECURING PARTS

(76) Inventor: Jeffrey D. Gaudette, Windsor (CA)

( * ) Notice: Subject to any disclaimer, the term of this patent is extended or adjusted under 35 U.S.C. 154(b) by 327 days.

(21) Appl. No.: 12/482,734

(22) Filed: Jun. 11, 2009

(65) Prior Publication Data
US 2009/0311065 A1 Dec. 17, 2009

Related U.S. Application Data

(60) Provisional application No. 61/060,764, filed on Jun. 11, 2008, provisional application No. 61/156,084, filed on Feb. 27, 2009.

(51) Int. Cl.
B61D 45/00 (2006.01)
(52) U.S. Cl. .............................. 410/43; 410/32; 410/33
(58) Field of Classification Search .................. 410/31, 410/32, 35, 43, 34, 143, 33, 39, 41, 46, 69, 410/80, 155; 248/225.11, 346.04, 222.12, 248/228.7, 230.7, 231.81; 211/41.1, 162, 211/72, 94.02; 206/451, 449, 454; 24/531, 24/545, 546
See application file for complete search history.

(56) References Cited

U.S. PATENT DOCUMENTS

| 2,946,453 | A | | 7/1960 | Pityo |
|---|---|---|---|---|
| 3,822,783 | A | | 7/1974 | Mortensen |
| 4,411,361 | A | | 10/1983 | Mentzer |
| 5,141,114 | A | | 8/1992 | Cate et al. |
| 5,267,652 | A | | 12/1993 | Carroll |
| 5,339,958 | A | | 8/1994 | Taravella et al. |
| 5,413,216 | A | | 5/1995 | Timmins |
| 5,582,495 | A | | 12/1996 | Schroeder |
| 5,598,924 | A | * | 2/1997 | McCann |
| 5,876,165 | A | | 3/1999 | Campbell |
| 6,315,121 | B1 | * | 11/2001 | Hansen |
| 6,394,721 | B1 | | 5/2002 | Campbell |
| 6,550,623 | B2 | | 4/2003 | Cook et al. |
| 6,598,756 | B1 | | 7/2003 | Rosenfeldt |
| 6,786,687 | B1 | * | 9/2004 | Schroeder ..................... 410/43 |

(Continued)

FOREIGN PATENT DOCUMENTS

DE 202006001933 5/2006

(Continued)

OTHER PUBLICATIONS

PCT International Search Report for PCT Application No. PCT/CA2009/000796, mailed Oct. 1, 2009.

(Continued)

Primary Examiner — Stephen Gordon
(74) Attorney, Agent, or Firm — Bereskin & Parr LLP

(57) ABSTRACT

A clip for securing a part, having a body portion having a first wall surface and a supporting surface adjacent the first wall surface, a retaining arm connected to the body, the retaining arm comprising a second wall surface opposite the first wall surface, an engaging portion at the distal end of the retaining arm, and an engaging surface on the engaging portion generally opposite the supporting surface. The first and second wall surfaces cooperate to define a groove that is sized and shaped to receive a portion of the part therein. The retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

28 Claims, 21 Drawing Sheets

U.S. PATENT DOCUMENTS

| | | |
|---|---|---|
| 7,001,130 B2 | 2/2006 | Ransom |
| 7,128,509 B2 | 10/2006 | Farley et al. |
| 7,237,993 B2 | 7/2007 | Farley et al. |
| 2005/0126952 A1 | 6/2005 | Kaltz et al. |
| 2008/0035513 A1 | 2/2008 | Farley et al. |

FOREIGN PATENT DOCUMENTS

| | | |
|---|---|---|
| FR | 2811252 | 1/2002 |
| GB | 2033462 | 5/1980 |

OTHER PUBLICATIONS

PCT Written Opinion for PCT Application No. PCT/CA2009/000796, mailed Oct. 1, 2009.

Canadian Office Action for CA Patent Application No. 2,690,120, mailed Apr. 1, 2010.

Extended European Search Report, Aug. 10, 2012 for corresponding European Patent Application Serial No. 09761202.2.

* cited by examiner

APPARATUS, SYSTEMS AND METHODS FOR SECURING PARTS

RELATED APPLICATIONS

This application claims priority to U.S. Provisional Patent Application Ser. No. 61/060,764, filed on Jun. 11, 2008 and entitled "PARTS RACK WITH LOCKING DUNNAGE", the entire contents of which are hereby incorporated by reference, and this application also claims priority to U.S. Provisional Patent Application Ser. No. 61/156,084, filed on Feb. 27, 2009 and entitled "APPARATUS, SYSTEMS AND METHODS FOR SECURING, LOADING AND UNLOADING PARTS USING LOCKING DUNNAGE", the entire contents of which are hereby also incorporated by reference.

TECHNICAL FIELD

The embodiments described herein relate to securing parts, and in particular to apparatus, systems and methods for securing parts using locking dunnage.

INTRODUCTION

Prior art dunnage systems have been designed to pack, support, and protect parts of various shapes and sizes. For example, in the automotive industry, manufacturers often ship automotive parts from manufacturing facilities (e.g. where the parts are made) to assembly plants (e.g. where the parts are assembled), with the parts being supported within racks using elongated strips of material having a series of spaced apart openings (e.g. "dunnage strips" or "dunnage bars"). The openings in the dunnage bars loosely support the parts within the racks. However, during transport the parts may shift or move within the openings, which is undesirable and may cause damage to the parts.

One known dunnage system, U.S. Pat. No. 6,394,721 (Campbell) describes a tubular dunnage bar of rectangular cross-section that has an inner wall, an outer wall and two side walls. The inner wall has a slot extending lengthwise of the dunnage bar. A channel extends lengthwise within the dunnage bar. The channel has a bottom wall spaced from and parallel to the inner and outer walls of the dunnage bar and side flanges secured to the side walls of the dunnage bar. The channel and the inner wall of the dunnage bar form a pocket. A dunnage strip is received in the pocket and has a nose projecting outwardly through the slot. The channel and the side walls and outer wall of the dunnage bar form a space. The bottom wall of the channel has a trough-shaped, strengthening portion displaced downwardly into the space. The trough-shaped portion of the bottom wall of the channel is arcuate in cross-section and is located midway between the side flanges of the channel. The space formed by the channel and the side walls and bottom wall of the dunnage bar is completely open and devoid of structure except for the trough-shaped portion of the bottom wall which projects downwardly into it.

Another dunnage system, U.S. Pat. No. 6,550,623 (Cook et al.) describes a rack for the transport of thin wall parts such as automotive body panels stampings has a steel frame with two parallel channels positioned on either side of a planar floor member. Each channel has a series of parallel slots which receive tabs extending downwardly from parallel plastic leaves. The leaves are restricted from removal from the rack by rods which extend through the frame beneath the channels and through rod openings in the tabs. The plastic leaves are of two types having side structures which do not nest. Because the leaves are not hinged to the floor member, they will stay in either position due to gravity. The non-nesting leaf side structures permit a plurality of leaves to be flipped from one position to the other simultaneously.

Finally, U.S. Pat. No. 5,141,114 (Cate, Jr. et al.) describes a method and apparatus for handling sheet metal stampings such as automotive body panels. A rack is disclosed in which a plurality of runner assemblies are positioned proximate the floor of the rack with each runner assembly including a galvanized steel base member secured to the floor structure of the rack and a top member secured to the base member. The top member includes a galvanized steel substrate and a cladding applied to the upper face of the substrate. The cladding comprises a lubricous material such, for example, as a polypropylene so that the cladding not only provides a mar-resistant surface to protect the finish of the sheet metal stamping but further provides a low friction lubricous surface to facilitate the sliding movement of the stamping along the runner as the stamping is moved into and out of the associated rack structure.

SUMMARY

According to one aspect, there is provided herein a clip for holding one or more parts on a rack. The clip includes a body attachable to the rack. The body has a groove extending across the body that is shaped to receive a flange or another portion of the part. The clip also includes a retaining arm extending outward from the body along the groove. The retaining arm is moveable between a locked position in which the retaining arm is configured to hold the flange or another portion of the part in the groove, and an open position in which the flange or another portion of the part can be inserted or removed from the groove. The retaining arm includes a resilient portion that allows the retaining arm to flex between the locked position and the open position. In some examples the resilient portion may bias the retaining arm towards the locked position.

Another aspect is a dunnage strip for holding at least one part on a rack. The dunnage strip includes an elongated base attachable to the rack, and a plurality of clips coupled to the elongated base in spaced apart relation along the length of the elongated base. Each clip includes a body having a groove extending across the body that is shaped to receive a flange of the at least one part. The clip also includes a retaining arm coupled to the body adjacent the groove and extending outward from the body along the groove. The retaining arm is moveable between a locked position in which the retaining arm is configured to hold the flange of the at least one part in the groove, and an open position in which the flange of the at least one part can be inserted or removed from the groove.

Another aspect is a rack for holding at least one part. The rack includes a frame, and a plurality of clips attachable to the frame. Each clip includes a body having a groove extending across the body that is shaped to receive a flange of the at least one part. The clip also includes a retaining arm coupled to the body adjacent the groove and extending outward from the body along the groove. The retaining arm is moveable between a locked position in which the retaining arm is configured to hold the flange of the at least one part in the groove, and an open position in which the flange of the at least one part can be inserted or removed from the groove.

The rack may also include at least one dunnage strip comprising an elongated base attachable to the rack, and wherein at least some of the clips are coupled to the elongated base in spaced apart relation along the length of the elongated base. Furthermore, the rack may include a first dunnage strip and a second dunnage strip, wherein the first dunnage strip and the second dunnage strip are staggered such that the clips of the first dunnage strip are longitudinally offset from the clips of the second dunnage strip. The offset between the clips on the first dunnage strip and the clips on the second dunnage strip may be approximately equal to one half the pitch between adjacent clips of one of the first dunnage strip or the second dunnage strip. In some examples, the first dunnage strip may be positioned laterally adjacent to the second dunnage strip.

According to another aspect, there is provided a clip for securing a part, comprising a body portion having a first wall surface and a supporting surface adjacent the first wall surface; a retaining arm connected to the body, the retaining arm comprising a second wall surface opposite the first wall surface, an engaging portion at the distal end of the retaining arm, and an engaging surface on the engaging portion generally opposite the supporting surface; wherein the first and second wall surfaces cooperate to define a groove that is sized and shaped to receive a portion of the part therein; and wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

The retaining arm may be biased toward the locked position.

In some embodiments, the second wall surface defines a groove plane, and the engaging surface defines an engaging plane, the engaging plane angularly offset from the groove plane by a first angle. In some embodiments, the first angle may between 0 and 45 degrees.

In some embodiments, the engaging surface and the supporting surface are generally complementary.

In some embodiments, the body has a width, and the groove extends through at least a portion of the width. In some embodiments, the width is between 0.1 and 10 centimeters. In some embodiments, the groove extends across the entire width.

In some embodiments, the first and second wall surfaces are at least partially parallel and are spaced apart by a groove width, wherein the groove width is selected to correspond to the thickness of the portion of the part to be received in the groove. In some embodiments, the groove width is between 0.1 and 3.0 centimeters.

The body may further comprise a buttress portion generally on the opposite side of the retaining arm as the supporting surface of the body portion, the buttress portion sized and shape for supporting a second portion of a second part.

In some embodiments, the portion of the part is a flange, and the groove is sized and shaped to correspond to the thickness of the flange.

In some embodiments, the retaining arm is integral with the body.

In some embodiments, the clip further comprises a nib that extends outwardly from the engaging portion, the nib sized and shaped for contacting the part and urging the retaining arm toward the open position when the part is inserted into the clip In some embodiments, the retaining arm comprises a resilient portion that biases the retaining arm towards the locked position. The resilient portion may comprise a plurality of slits formed in the retaining arm.

In some embodiments, at least a portion of the first and second opposing wall surfaces include a resiliently deformable material configured to apply a biasing force against the portion of the part when received in the groove.

In some embodiments, the body is configured to be connected directly to a rack for carrying the part.

In some embodiments, the clip further comprises a locking tab extending outwardly from the engaging surface. The locking tab may have a width that is substantially less that the width of the retaining arm.

According to another aspect, there is provided a dunnage strip for securing one or more parts, the dunnage strip comprising an elongate base extending along a longitudinal axis; at least one clip connected to the base, each clip having: a body portion having a first wall surface and a supporting surface adjacent the first wall surface; a retaining arm connected to the body, the retaining arm comprising a second wall surface opposite the first wall surface, an engaging portion at the distal end of the retaining arm, and an engaging surface on the engaging portion generally opposite the supporting surface; wherein the first and second wall surfaces cooperate to define a groove that is sized and shaped to receive a portion of the part therein; and wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

At least one of the clips may be configured to pivotally rotate about a pivot axis with respect to the elongate base. At least one of the clips may be inclined at an angle relative to the elongate base.

At least one of the clips may be coupled to the dunnage strip using at least one clip receiver. The at least one clip receiver may comprises a plurality of attachment points spaced about its surface.

According to yet another aspect, there is provided a rack for holding parts, the rack comprising a frame; at least one dunnage strip coupled to the frame, each dunnage strip comprising an elongate body and having at least one clip connected thereto; each clip comprising: a body portion having a first wall surface and a supporting surface adjacent the first wall surface; a retaining arm connected to the body, the retaining arm comprising a second wall surface opposite the first wall surface, an engaging portion at the distal end of the retaining arm, and an engaging surface on the engaging portion generally opposite the supporting surface; wherein the first and second wall surfaces cooperate to define a groove that is sized and shaped to receive a portion of the part therein; and wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

In some embodiments, the at least one dunnage strip includes at least two dunnage strips that are offset so that a part held by the first dunnage strip engages a buttress of at least one clip on the second dunnage strip.

According to yet another aspect, there is provided a clip for securing a part, comprising a body portion having a first wall surface, a second wall surface opposite the first wall surface, and a supporting surface adjacent the first wall surface; a retaining arm connected to the body, the retaining arm comprising an engaging portion at the distal end of the retaining arm, and an engaging surface on the engaging portion generally opposite the supporting surface; wherein the first and second wall surfaces cooperate to define a groove that is sized and shaped to receive a portion of the part therein; and wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of methods and apparatus of the present specification and are not intended to limit the scope of what is taught in any way. In the drawings.

DETAILED DESCRIPTION

Figure 1:
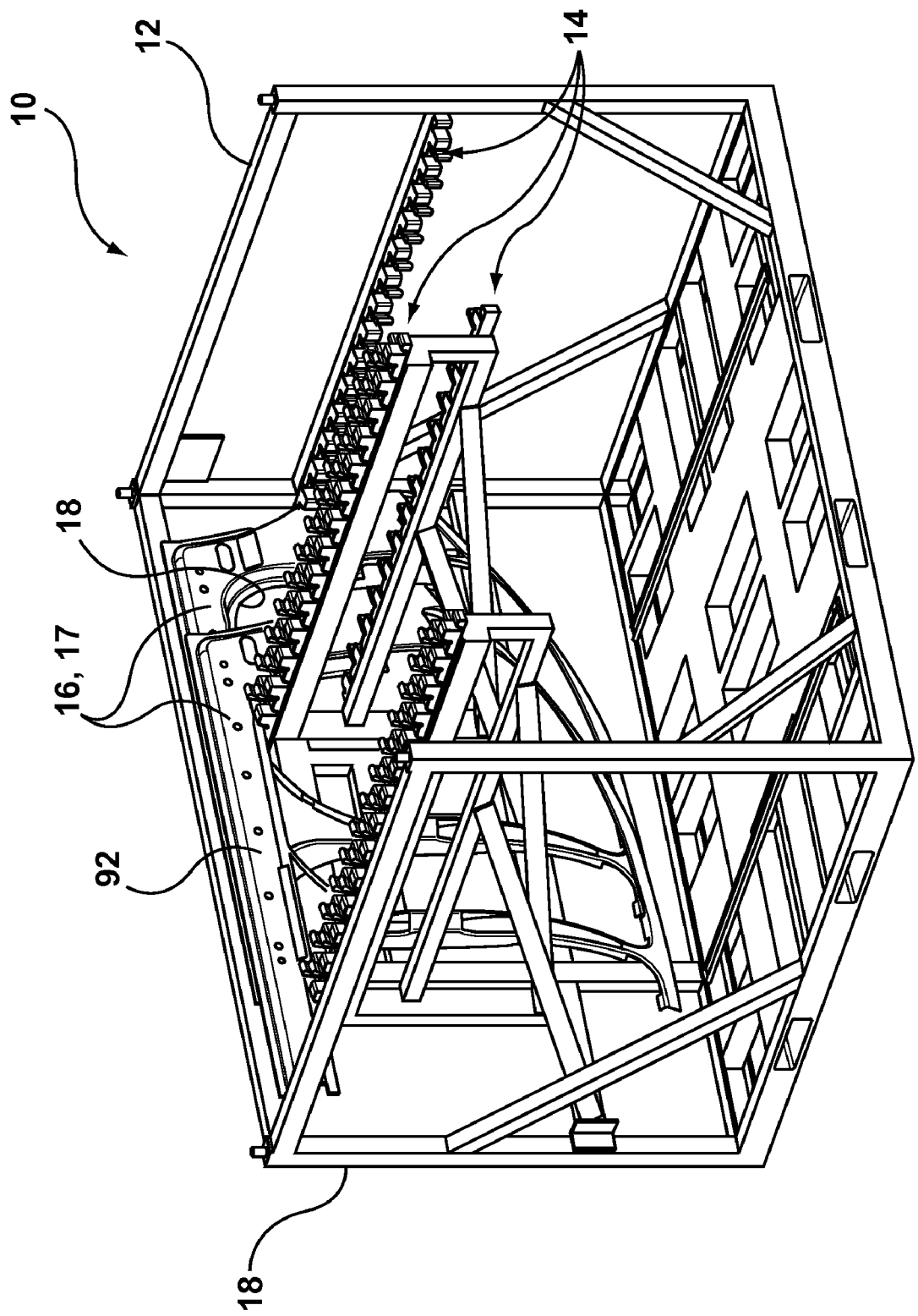
FIG. 1 is a front perspective view of a rack for securing parts according to one embodiment.
Figure 2:
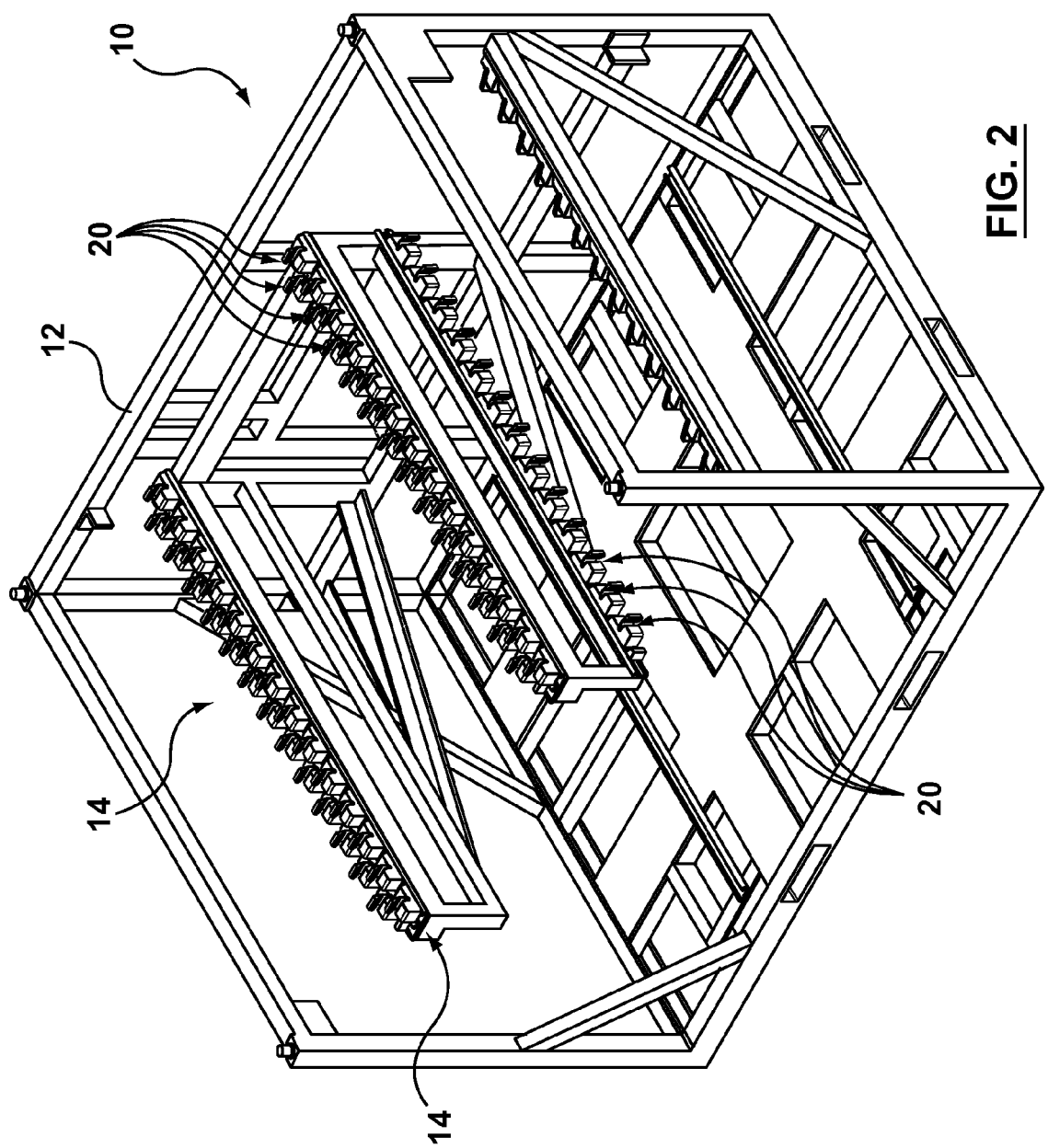
FIG. 2 is another front perspective view of the rack of FIG. 1.

Referring to FIGS. 1 and 2, illustrated therein is a rack 10 that includes a frame 12, and at least one dunnage strip 14 attachable to the frame 12. The rack 10 may be used to hold parts 16, such as automotive parts (vehicle door rings or panels, vehicle hoods, etc.), other metal stampings, or the like.

Figure 5:
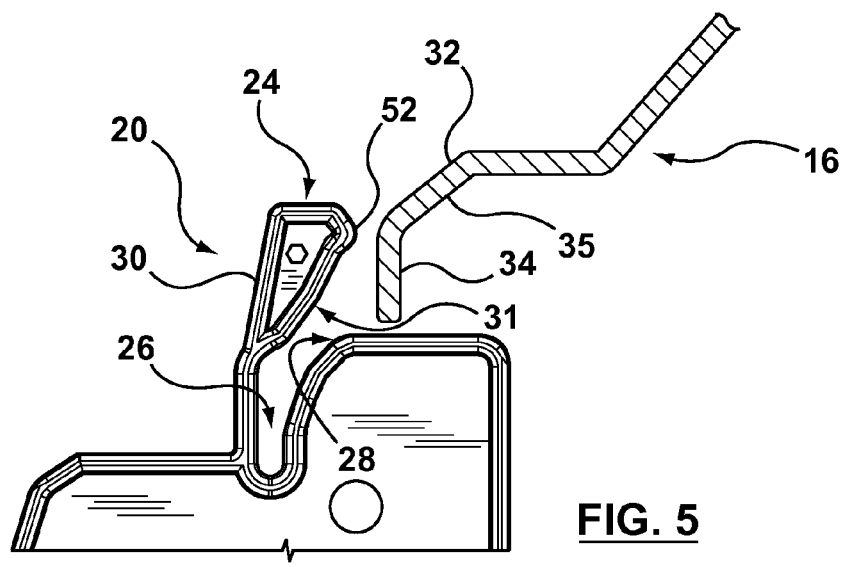
FIG. 5 is a side view of a part being inserted into the clip of FIG. 3, wherein the part is approaching the clip.
Figure 6:
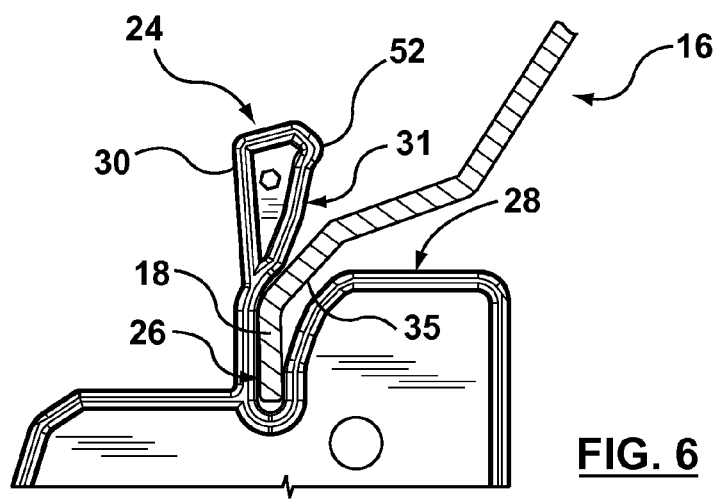
FIG. 6 is a side view of a part being inserted into the clip of FIG. 5, wherein the retaining arm is in an open position.
Figure 7:
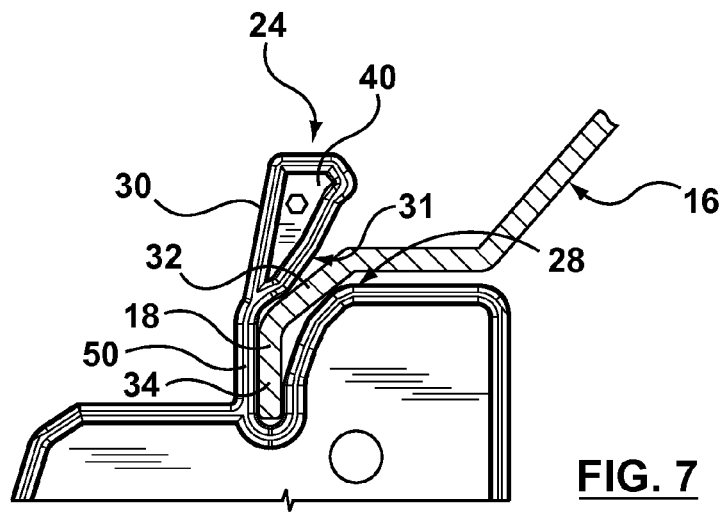
FIG. 7 is a side view of a part being inserted into the clip of FIG. 5, wherein the retaining arm is in an locked position and secures the part in the groove.

As shown in FIG. 1, in this embodiment the part 16 is a door ring 17, and has at least one flange 18 around at least part of the perimeter of the part 16 (as shown in greater detail in FIGS. 5, 6 and 7). The flange 18 may be a welding flange used for welding the door ring 17 to other parts of an automobile or truck during assembly.

Referring now generally to FIGS. 3 to 7, the dunnage strip 14 as shown includes an elongated base 19 that extends along a longitudinal axis X, and has a series of clips 20 coupled to or provided on the elongated base 19. Each clip 20 is configured to hold a flange 18 or another portion of a part 16 on the rack 10.

As shown, each clip 20 generally include a body 22 coupled to or provided on the elongated base 19, and a retaining arm 24 extending outwardly from the body 22 and upwards away from the base 19.

As shown, the body 22 of each clip 20 may be permanently affixed to the elongated base 19 (e.g. the body 22 of each clip 20 may be formed integrally with the base 19, for example where the dunnage strip 14 is formed of molded plastic).

In other embodiments, the body 22 of each clip 20 may be removably attachable to the elongated base 19. For example, the body 22 may be attached to the elongated base 19 using bolts, tongue-in-groove connections, weldments, or other suitable fastening techniques.

In yet other embodiments, the body 22 of a clip 20 may be configured to attach directly attached to the frame 12 of the rack 10 instead of being attached to the elongated base 19. For example, the rack 10 may include at least one clip 20 attached to the frame 12 of the rack.

Figure 4:
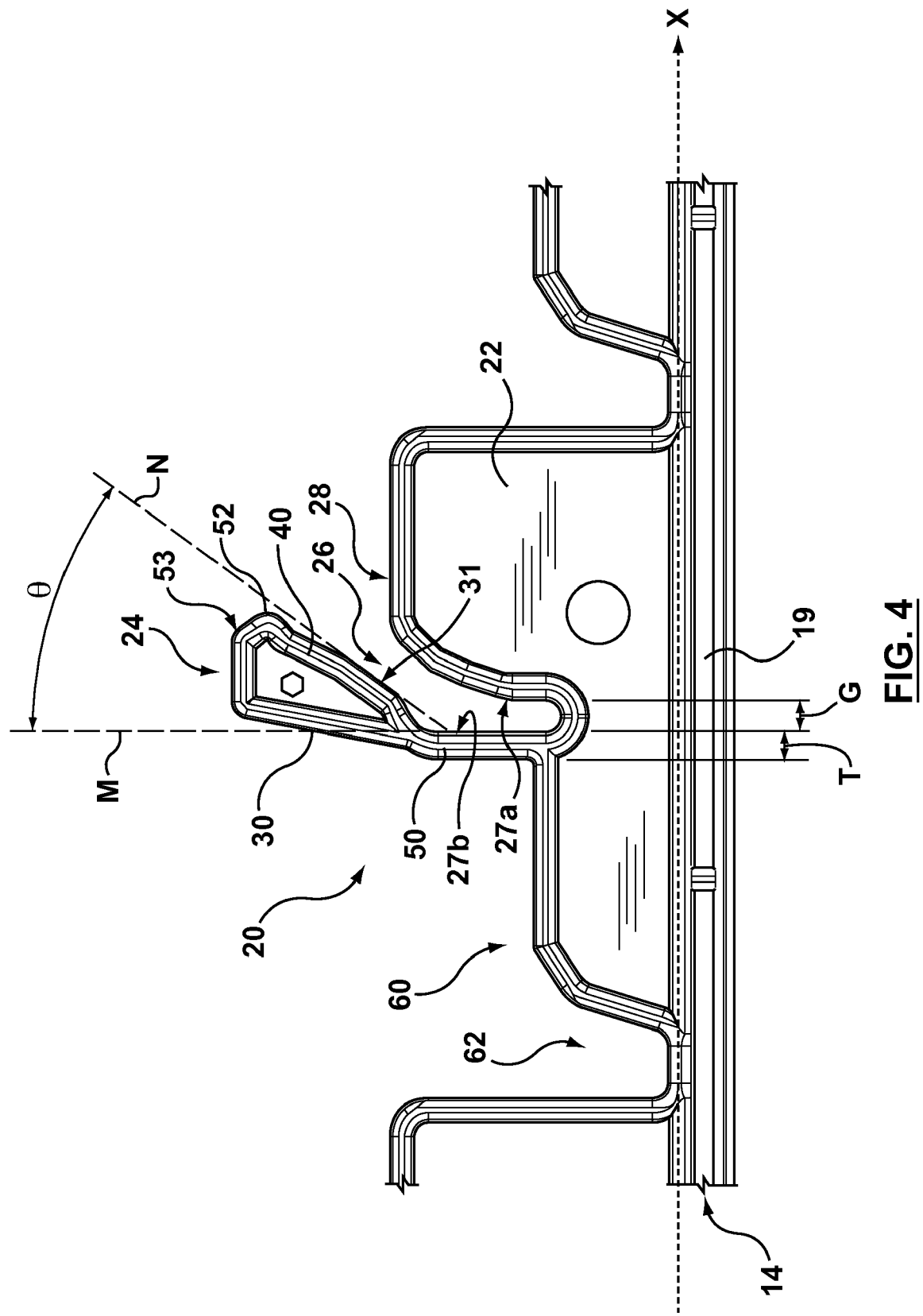
FIG. 4 is a side view of a portion of the dunnage strip of FIG. 3 showing one clip in detail.

Referring now to FIG. 4, each clip 20 generally has a groove 26 therein for receiving a portion (e.g. the flange 18) of a part 16. As shown, in some embodiments the groove 26 may be defined by two opposing wall surfaces 27a and 27b provided on the clip 20.

The distance between the two wall surfaces 27a and 27b may be described as a groove width G. In some embodiments, the groove width G is relatively small (e.g. the groove 26 is narrow) and is sized and shaped to be suitable for receiving a flange 18 of a part 16.

In some embodiments, the groove width G is between 0.1 and 3.0 centimeters. In other embodiments, the groove width G is between 0.5 and 1.5 centimeters. In other embodiments, the groove width G is less than about 5 centimeters.

Figure 16:
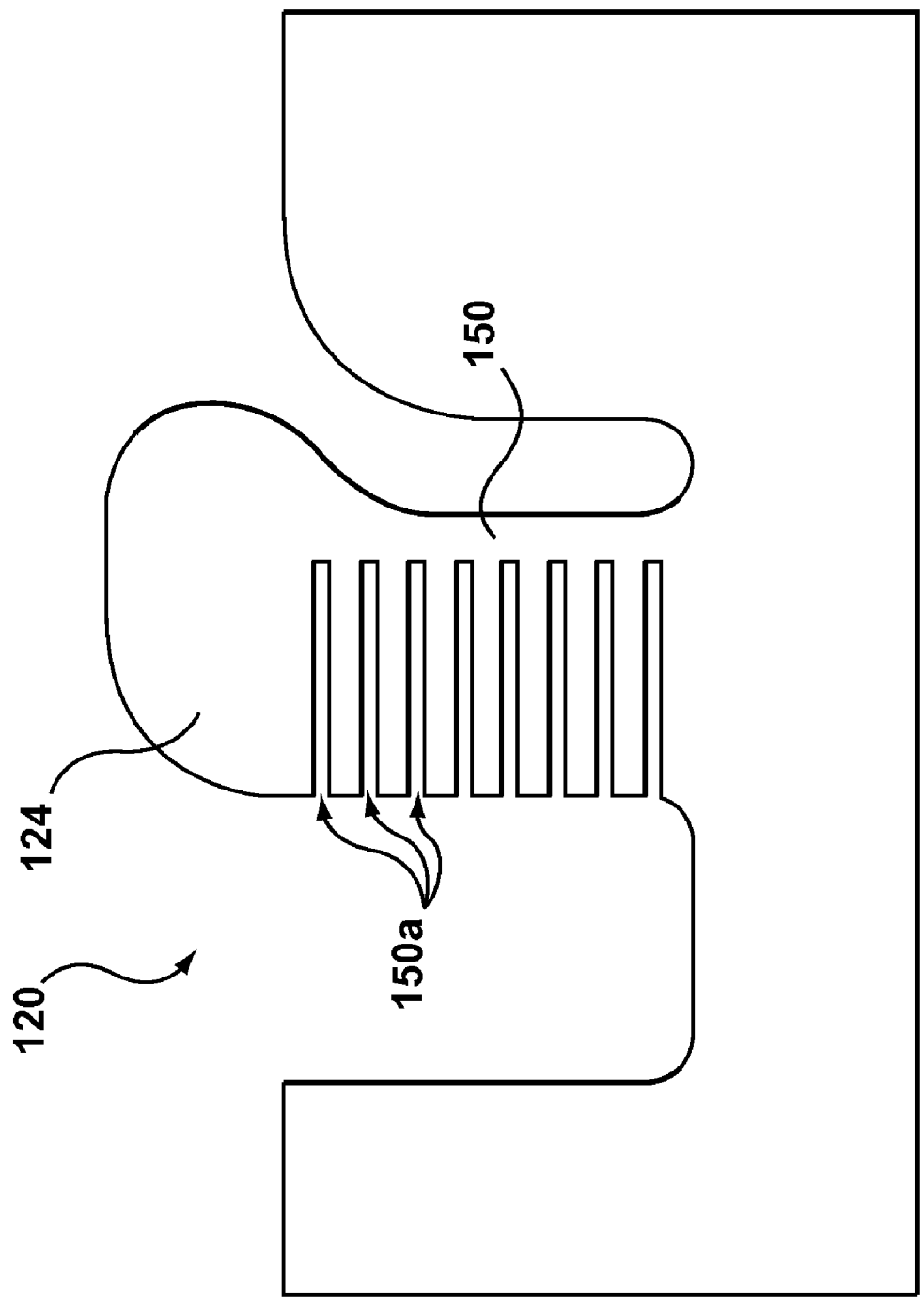
FIG. 16 is a side view of a clip having slits on a retaining arm according to a further embodiment.

As shown in FIG. 2, the first wall surfaces 27a may be provided on the body 22, and the second wall surface 27b may be provided on the retaining arm 24. Alternatively, in other embodiments, both wall surfaces 27a, 27b may be provided on the body 22 (e.g. as shown in FIG. 16).

Figure 3:
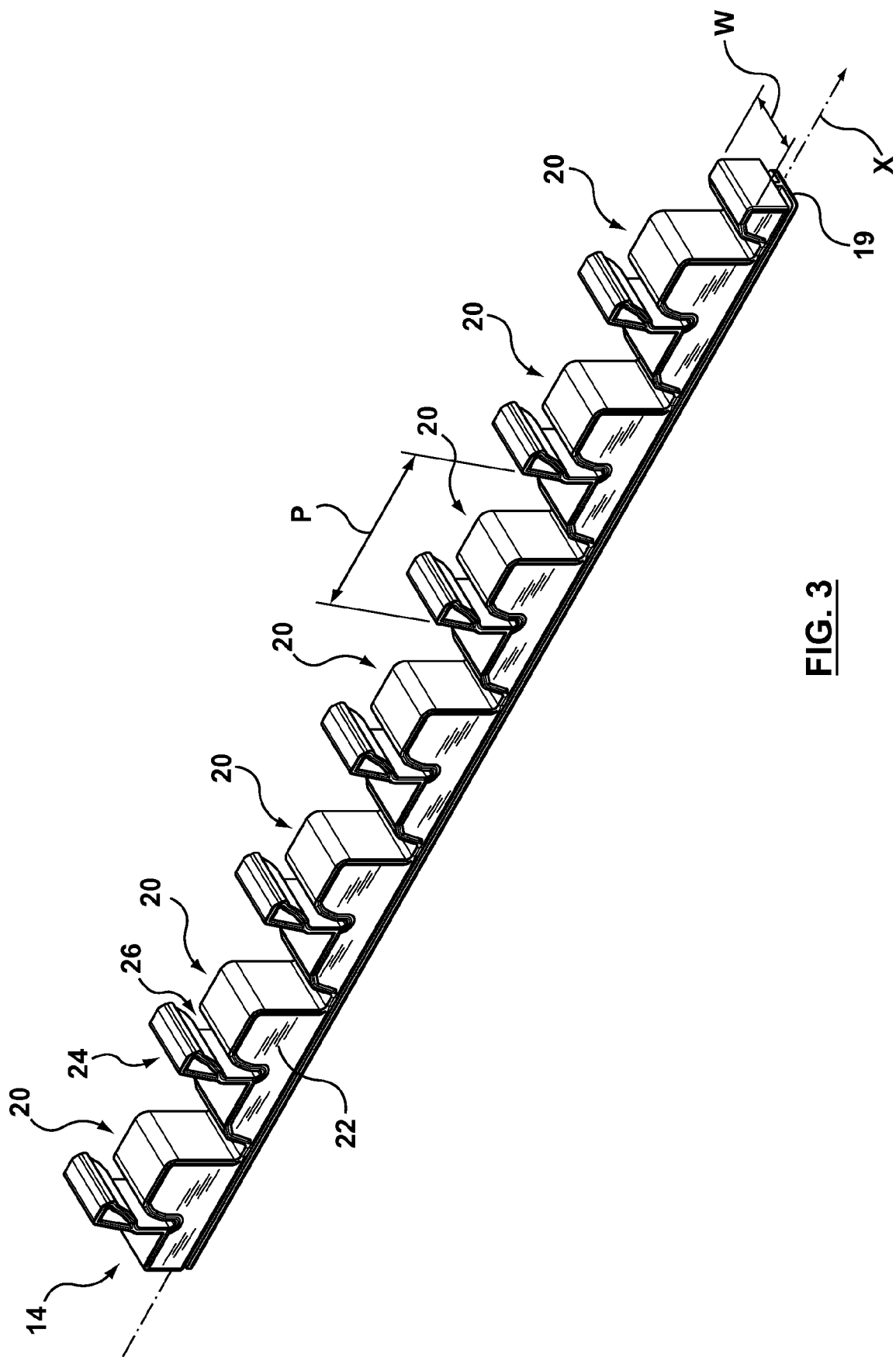
FIG. 3 is a front perspective view of a dunnage strip having a plurality of clips according to one embodiment.

As shown in FIG. 3, the dunnage strip 14 (and correspondingly each body 22 and retaining arm 14) has a width W, and each groove 26 may extend through the width W of the dunnage strip 14. In the illustrated embodiment, the groove 26 is transverse to the longitudinal axis X of the dunnage strip 14 and extends through the entire width W of the dunnage strip 14.

Alternatively, the groove 26 may extend through the width W of the dunnage strip 14 at an acute or obtuse angle to the longitudinal axis X. In some embodiments, the groove 26 may extend only partially through the width W of the dunnage strip 14.

In some embodiments, the width W is between 0.1 and 10 centimeters. In other embodiments, the width W is between 1.0 and 5 centimeters. In other embodiments, the width W is between 4.0 and 5.0 centimeters. In other embodiments, the width W is greater than 4.0 centimeters.

Generally, the groove 26 is sized and shaped to correspond with the size and shape of the flange 18 or another portion of the part 16 to be received in the groove 26. For example, the groove 26 may have a depth corresponding to the length of a lower portion 34 of the flange 18, and a groove width G selected to accommodate the thickness of the flange 18, as will be described in further detail below.

As shown in FIG. 4, each body 22 may also have a supporting surface 28 provided thereon and located adjacent to the first wall surface 27a of the groove 26. The supporting surface 28 is generally shaped to support a rear side 35 of the part 16 (e.g. the rear side 35 of a curved or angled portion 32 of the flange 18) as will be described in further detail below.

Referring again to FIGS. 3 and 4, as shown the retaining arm 24 is generally located opposite of the supporting surface 28, extending outwardly from the body 22 and away from the base 19.

In some embodiments, the retaining arm 24 may be integrally formed with the body 22 (as shown), for example where the dunnage strip 14 is molded from plastic.

In other embodiments, the retaining arm 24 may be separate from the body 22. For example, the retaining arm 24 may be pivotally attached to the body 22 using one or more fasteners, such as a bolt, a spring-loaded hinge, etc.

Referring now to FIGS. 5, 6 and 7, the retaining arm 24 is generally moveable between an open or receiving position, wherein the portion 18 of the part 16 may be received in the groove 26, and an engaged or locked position, wherein the retaining arm 24 retains the portion 18 of the part 16 within the groove 26 so as to inhibit removal of the part 16 therefrom.

For example, FIG. 5 shows the retaining arm 24 in the locked position as a part 16 is approaching the clip 20 (and prior to the flange 18 being inserted or received within the groove 26).

In FIG. 6, the part 16 has been moved to engage the retaining arm 24, and is applying a force against the retaining arm 24 to move the retaining arm 24 into the open position, thus and allowing the flange 18 to be inserted into the groove 26.

FIG. 7 shows the retaining arm 24 returned to the locked position again after the flange 18 has been received within the groove 26 (e.g. in this embodiment, the retaining arm 24 is biased to return to the locked position). As shown, the retaining arm 24 is sized and shaped so that when the retaining arm 24 is in the locked position, the retaining arm 24 holds or secures the flange 18 (or another portion of the part 16) within the groove 26, thus securing the part 16 to the clip 20.

When it is desired to remove the part 16, sufficient force may be applied to the part 16 (e.g. by pulling on the part 16) to cause the retaining arm 24 to move (e.g. flex) into the open position, allowing the flange 18 of the part 16 to be removed from the groove 26.

In particular, the retaining arm 24 generally includes a distal end 30 sized and shaped to engage the part 16 when the retaining arm 24 is in the locked position. The engagement of the distal end 30 with the part 16 helps hold the part 16 in place within the groove 26, and inhibits disengagement of the part 16 as desired (e.g. during transportation of the parts 16).

As shown, the distal end 30 includes an engaging surface 31 that at least partially overhangs the groove 26 when the retaining arm 24 is in the locked position (as shown in FIG. 7). Generally, the engaging surface 31 is configured to engage the part 16 when the retaining arm 24 is in the locked position and the flange 18 is in the groove to secure the part 16 to the clip 20.

In particular, the engaging surface 31 may press on a curved or angled portion 32 of the flange 18 so as to tend to wedge, nip, pinch or otherwise secure the rear side 35 of the lower portion 34 of the flange 18 against the support surface 28 of the body 22, so as to secure the lower portion 34 of the flange 18 within the groove 26.

As shown in FIG. 4, the second wall surface 27b can be considered to generally define a groove plane M, while the engaging surface 31 on the generally defines an engaging plane N.

As shown, the engaging plane N may be angularly offset from the groove plane by a first angle θ. The first angle θ may be selected in so as to ensure that the engaging surface 31 of the retaining arm 24 overhangs the groove 26 when the retaining arm 24 is in the locked position by a sufficient amount to secure the flange 18 of the part 16 within the groove 26.

In some examples, the first angle θ is between 0 and 45 degrees. In other examples, the first angle θ is between 15 and 30 degrees. In other examples, the first angle θ is about 30 degrees. In yet other angles, the first angle θ is less than 90 degrees.

In some embodiments, the first angle θ is chosen for a given clip 20 based on the dimensions (e.g. the size and shape) of the particular part 16 being inserted in the groove 26. Generally, however, the first angle θ may be standardized for use with multiple different types of parts. Thus, the same clip 20 may be used with parts of various shapes and sizes, by securing the flange 18 of each part (particularly since the flanges of parts are often very similar in size and shape).

As shown in FIG. 4, in some embodiments, the engagement surface 31 and the supporting surface 28 are complementary at or near the narrowest point between the retaining arm 24 and the support surface 28 (also known as the throat or neck).

While it is generally desirable that the clip 20 be configured to hold the flange 18 securely within the groove 26 to inhibit movement of the flange 26, in some embodiments the retaining arm 24 may loosely hold the flange 18 in the groove 26 allowing limited movement of the flange 18 while still securing the part 16 on the rack 10. In particular, the engaging surface distal end 30 may not press on the part 16 when the part 16 is received within the groove 26, but may simply cooperate with the supporting surface 28 so as to inhibit or interfere with the removal of the part 16 from the groove 26. In such cases the retaining arm 24 may be considered to loosely hold the flange 18 within the groove 26, while still generally securing the part 16 to the clip 20.

The engaging surface 31 is generally provided on an engaging portion 40. As shown, in some embodiments the engaging portion 40 may be thicker or larger than other portions of the retaining arm 24. Generally, the engaging portion 40 provides the engaging surface 31 thereon and is configured to allow the engaging surface 31 to engage the part 16 during use.

In some embodiments, the engaging portion 40 at least partially overhangs the groove 26 (when the retaining arm 24 is in the locked position) so that and the engaging surface 31 may cooperate with the supporting surface 28 to secure the part 16 to the clip 20.

In other examples, instead of pressing on a curved or angled portion 32, the engaging portion 40 may apply pressure against the lower portion 34 of the flange 18 when the retaining arm 24 is in the locked position. In such examples, the retaining arm 24 may hold the flange 18 or other portion of the part 16 within the groove 26 by frictionally engaging the lower portion 34 between the engaging portion 40 and the first wall surface 27a.

In some embodiments, one or more portions of the wall surfaces 27a, 27b of the clip 20 may be made of a soft, malleable material that may conform to the shape of the flange 18 so as to further inhibit movement of the flange 18 within the groove 26 when the retaining arm 24 is in the locked position. For example, the wall surfaces 27a, 27b may have foam block portions, sponges, or other suitable materials provided thereon and which can be compressed and which will tend to provide a biasing force against the flange 18.

In some examples, the body 22 may be made from a soft, malleable material while the retaining arm 24 may be made from a harder, more resilient material. In other examples, the body 22 and retaining arm 24 may be made from the same material.

Referring again to FIG. 4, as shown the retaining arm 24 is integrally formed with the body 22, and includes a lower resilient portion 50 generally coupled to and located adjacent to the body 22. In some embodiments, the resilient portion 50 is configured so that the retaining arm 24 can move or flex flex between the locked position and the open position.

In some embodiments, the retaining arm 24 is biased towards the locked position. For example, the resilient portion 50 may be configured to bias the retaining arm 24 toward the locked position. While an entity (e.g. a human user, a robot, etc.) may apply sufficient force to move the retaining arm 24 to the open position (e.g. when inserting a part 16 into the clip 20), when the force is removed the retaining arm 24 will tend to return to the locked position, thus securing the part 16 to the clip 20.

In some embodiments, the retaining arm 24 may also include a nib 52 that extends outward from the retaining arm 24. For example, as shown the nib 52 may be located on an outer surface 53 of the engaging portion 40 that is generally above the engaging surface 31. In other examples, the nib 52 may be located on another surface of the retaining arm 24 (and may be located on the engaging surface 31).

Generally, the nib 52 is sized and shaped to receive and direct the application of forces that move the retaining arm 24 from the locked position to the open position. For example, the nib 52 may extend outwardly beyond the engaging surface so as to focus or direct the application of an incoming force on the retaining arm 24 onto a specific location in order to reduce the extent of random loading along the retaining arm 24, which could otherwise cause premature failure of the retaining arm 24 (e.g. due to excessive loading at undesirable locations).

For example, the nib 52 can be particularly beneficial when a robot loads and unloads the part 16 on the rack 10, such as in an automotive assembly line. Particularly, the nib 52 may allow the robot to more easily locate the retaining arm 24 and ensure that forces are being applied at the desired location on the retaining arm 24. After locating the retaining arm 24, the robot may push the nib 52 by a predetermined distance (e.g. corresponding to the open position of the retaining arm 24) so as to insert the flange 18 of a part 16 into the groove 26.

Without the nib 52, the robot may not be able to as accurately locate the retaining arm, and thus may press against the retaining arm 24 in random or various locations, which may increase the risk of failure (e.g. due to excessive loads being applied to the retaining arm 24 at an improper location).

In particular, if a robot pushes the retaining arm 24 by the predetermined distance but at a location below the nib 52, the robot may over-bend and overstress the retaining arm 24, which may fracture or otherwise damage the retaining arm 24. By providing a nib 52 on the retaining arm 24, the robot may more easily repeatedly press against the same (or a substantially similar) location on the retaining arm 24, which may reduce the probability of damaging the retaining arm 24.

In some examples, a portion of the retaining arm 24 (e.g. the engaging portion 40, engaging surface 31 or nib 52), is configured to engage the part as it is being inserted into the groove 26 and to receive an application of force from the part as it is inserted. This opening force is then transferred to the resilient portion 50 (or other biasing member).

If the opening force is sufficient to overcome the biasing force exerted by the resilient portion 50 (or other biasing member) then the retaining arm 24 may be moved into its open position by the insertion of the part 16.

Once the part 16 is received within the groove 26, the opening force is no longer being exerted and the retaining arm 24 will tend to automatically return to its locked position, thereby securing the part 16 within the groove 26. In this configuration, there is generally no need for an operator (human or robot) to manually open or close the retaining arm 24 since inserting the part 16 automatically opens and closes the retaining arm 24.

Similarly, the engaging portion 40 (or other portion) of the retaining arm 24 may be configured so that the part 16 can be removed from the groove 26 by transferring a sufficient removal force from the part 16 to the retaining arm 24 to overcome the biasing of the retaining arm 24 and move the retaining arm 24 to the open position. This removal force may be applied to the retaining arm 24 by the part 16 itself, generally without the need for an operator to manually open the retaining arm 24.

In some embodiments, the retaining arm 24 (and its biasing member) may be configured so that removal force required to overcome the biasing force urging the retaining arm 24 closed is greater than the weight of the part being held (so that the part 16 will not fall out merely under the force of gravity, for example when the dunnage strip 14 is inverted) but is low enough that a sufficient removal force can be generated as desired (e.g. by a human operator or by a robot) to remove the part 16 from the groove 26.

In some embodiments, the resilient portion 50 may have a thickness T selected to accommodate the resilient flexing as generally described above. For example, the thickness T may depend on the type of material used to make the clip 20. Generally, softer materials flex more than harder materials and the thickness T of the resilient portion 50 may be adjusted accordingly. For example, if the clip 20 is made from rubber, the resilient portion 50 may be thicker than if the clip 20 were made from polycarbonate.

Generally, all or a portion of the clip 20 and/or the dunnage strip 14 may be made from any suitable material, such as polycarbonate, rubber, acrylonitrile butadiene styrene (ABS), xenoy (e.g. Xenoy® Resin 5720 (polycarbonateand polybutelyne terephthalate), wood, metals, or plastics including thermoplastics and thermosets.

In some examples, the resilient portion 50 may be replaced and/or supplemented by another biasing element or member, such as a coil spring or a leaf spring, mounted between the body 22 and the retaining arm 24. Similarly, the retaining arm 24 may cooperate with the body 22 to form a mechanism that allows the retaining arm 24 to move between the locked position and the open position.

Figure 8:
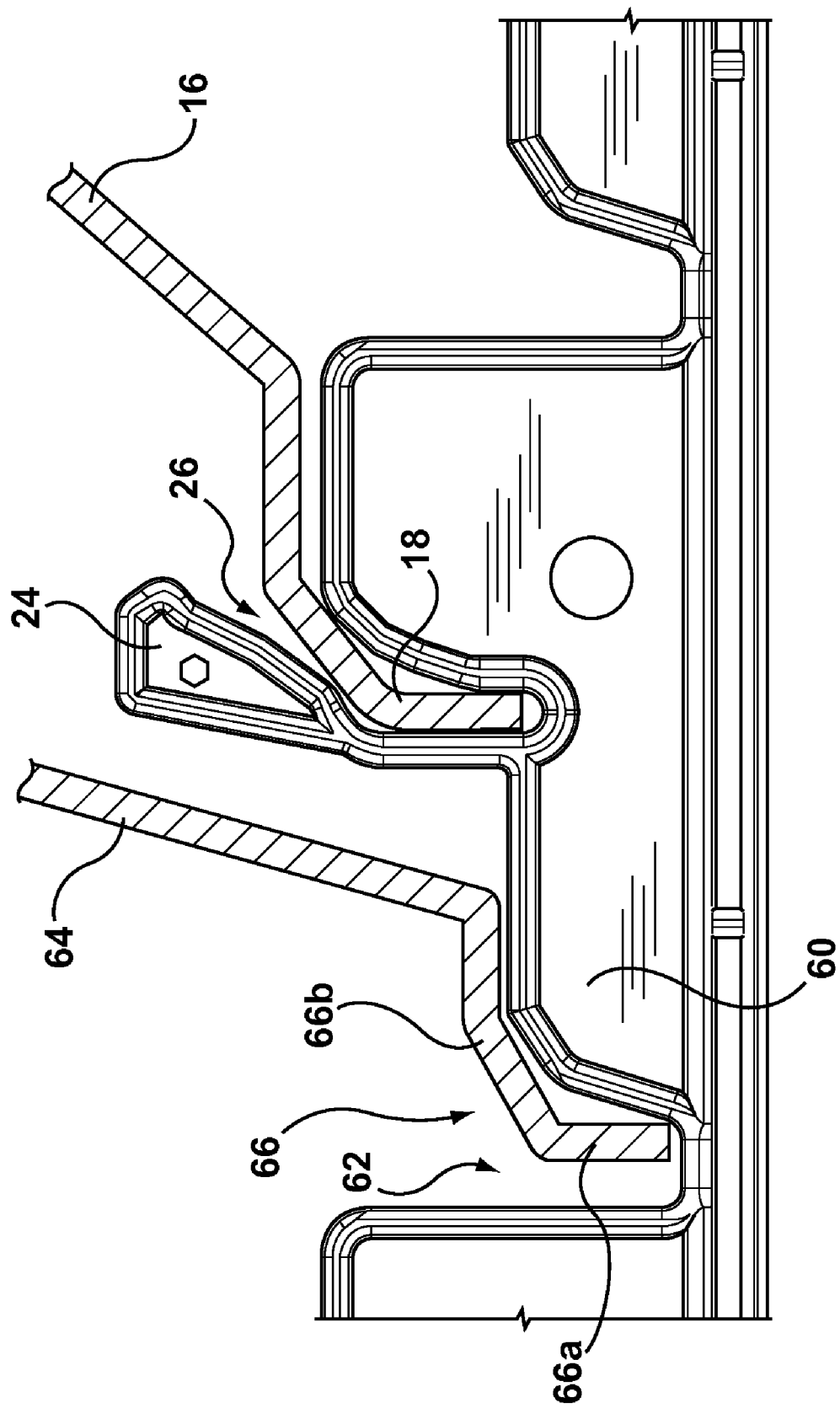
FIG. 8 is a detailed side view of the dunnage strip of FIG. 3, showing two parts being supported by the dunnage strip.

Referring now to FIGS. 4 and 8, the clip 20 may also include a buttress 60 adjacent to the retaining arm 24 and the groove 26 (and generally on the opposite side as the supporting surface 28 of the body portion 22). As shown in FIG. 8, the buttress 60 is generally shaped to support a second part 64 located adjacent to part 16 on the rack 10. For example, the buttress 60 may be formed with the body 22 so as to define a recessed portion 62, which may receive and support a flange 66 or another portion of a second part 64 (generally without positively securing the flange 66 of the second part 64). Specifically, the lower portion of the flange 66a may be received within the recessed portion 62, and the buttress 60 may support the curved or angled portion 66b of the flange.

Generally, the buttress 60 supports the flange 66 of the second part 64 within the recessed portion 62, however the buttress 60 need not secure or hold the flange 66 within the recessed portion 62. While the buttress 60 may not secure the flange 66, the buttress 60 can be useful when a part needs to be supported on the rack 10 at multiple locations, such as at two or more flanges.

For example, if a part were supported at a greater number of locations by retaining arms 24 that hold flanges 18 or other portions of the part 16, it may be more difficult to open all of the retaining arms 24 simultaneously when inserting or removing the part from the rack 10. In contrast, where a part is supported or secured at fewer locations (e.g. one location) by a retaining arm 24 and the other locations are supported by buttresses 60, it may be easier to insert or remove that part because only one retaining arm 24 needs to be opened when inserting or removing the part from the rack 10.

Referring again to FIG. 3, as shown the clips 20 are coupled to the elongated base 19 in a spaced apart relationship along the length of the dunnage strip 14, with adjacent clips 20 being spaced apart by a spacing or pitch P.

As shown, the pitch P between adjacent clips may be the same or similar. For example, the pitch P may be approximately the width or thickness of each part 16, or may be slightly larger to allow some clearance between adjacent parts 16.

Alternatively, the pitch P between clips 20 may be different.

Each dunnage strip 14 is generally attachable to the frame 12 of the rack 10. In some cases, a dunnage strip 14 is removably attachable to the frame 12. In other cases, a dunnage strip 14 may be permanently affixed to the frame 12. For example, a dunnage strip 14 may be attached to the frame 12 using bolts, tongue-in-groove connections, weldments, or any other suitable fastening systems.

Figure 9:
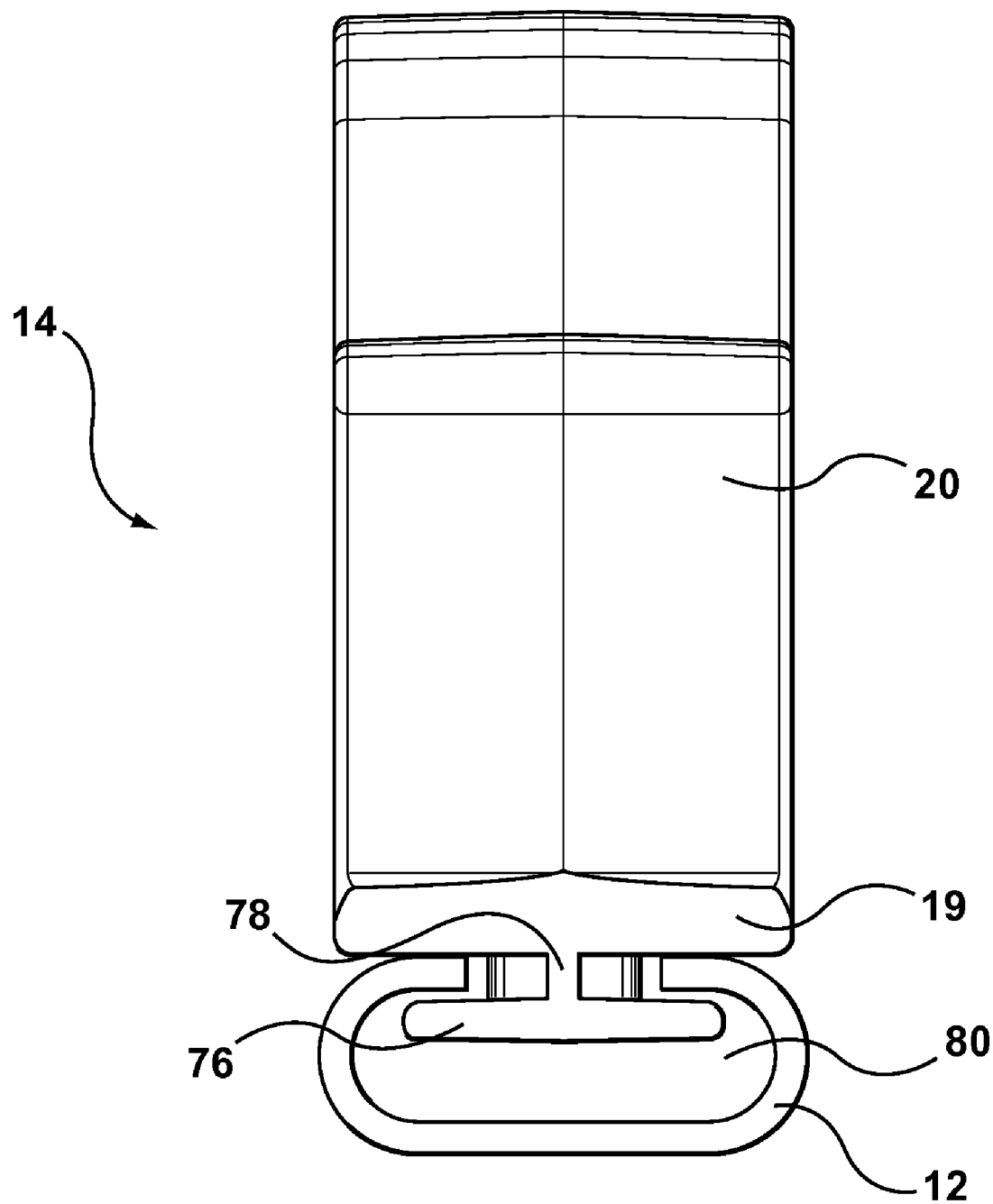
FIG. 9 is a front view of the dunnage strip of FIG. 3 as attached to a rack.

Referring to FIG. 9, the dunnage strip 14 may be attachable to the frame 12 using an elongate slotted connection (e.g. similar to a tongue-in-groove connection). Specifically, the base 19 of the dunnage strip 14 may have an T-shaped profile (and which may be extruded) having a wide body portion 76 and a narrow neck portion 78. During attachment, the T-shaped extrusion profile may slide into a slotted channel 80 provided on the frame 12.

Figure 10:
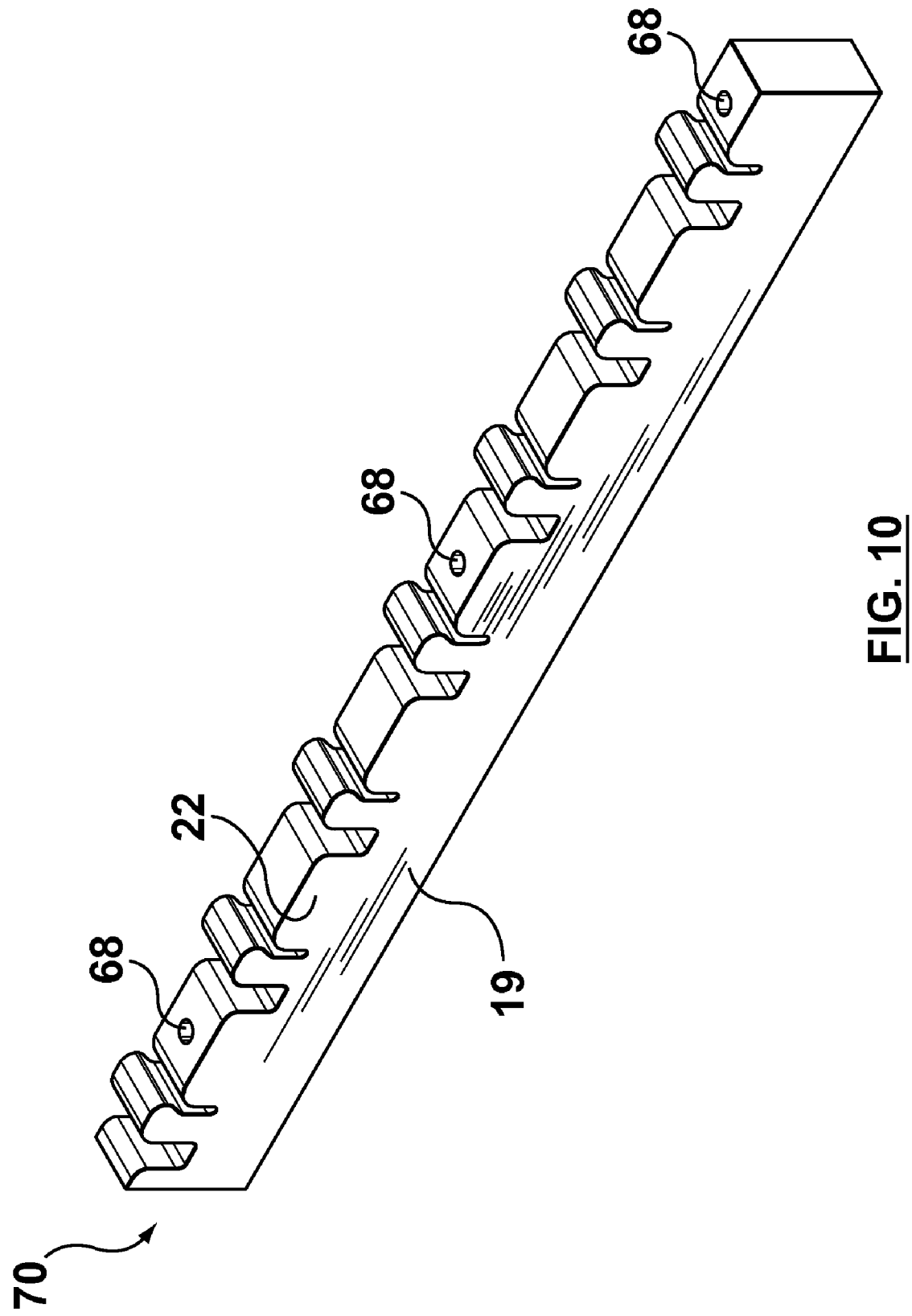
FIG. 10 is a front perspective view of a dunnage strip according to another embodiment.

Referring to FIG. 10, a dunnage strip 70 is shown according to another embodiment. The base 19 of the dunnage strip 70 may be formed integrally with the body 22 of each clip and the entire dunnage strip 14 may be attachable to the frame 12 using bolts that can be inserted through boreholes 68 that extend through the dunnage strip 14 and into the frame 12.

Generally, the dunnage strips 14 disclosed herein tend to facilitate increasing the packing density of parts being stored on a rack of a given size.

In contrast, conventional dunnage systems often have large amounts of clearance between parts to accommodate rattling or movement of the parts during transport. If the clearance in such conventional systems between parts is too small, the parts may hit each other or the rack, resulting in damaged parts.

However, when using the dunnage strips as generally disclosed herein, less clearance may be needed between parts because the clips 20 tend to securely hold the parts 16 in place within the grooves 26 and may be configured to inhibit any movement of the parts 16 during transportation.

Figure 11:
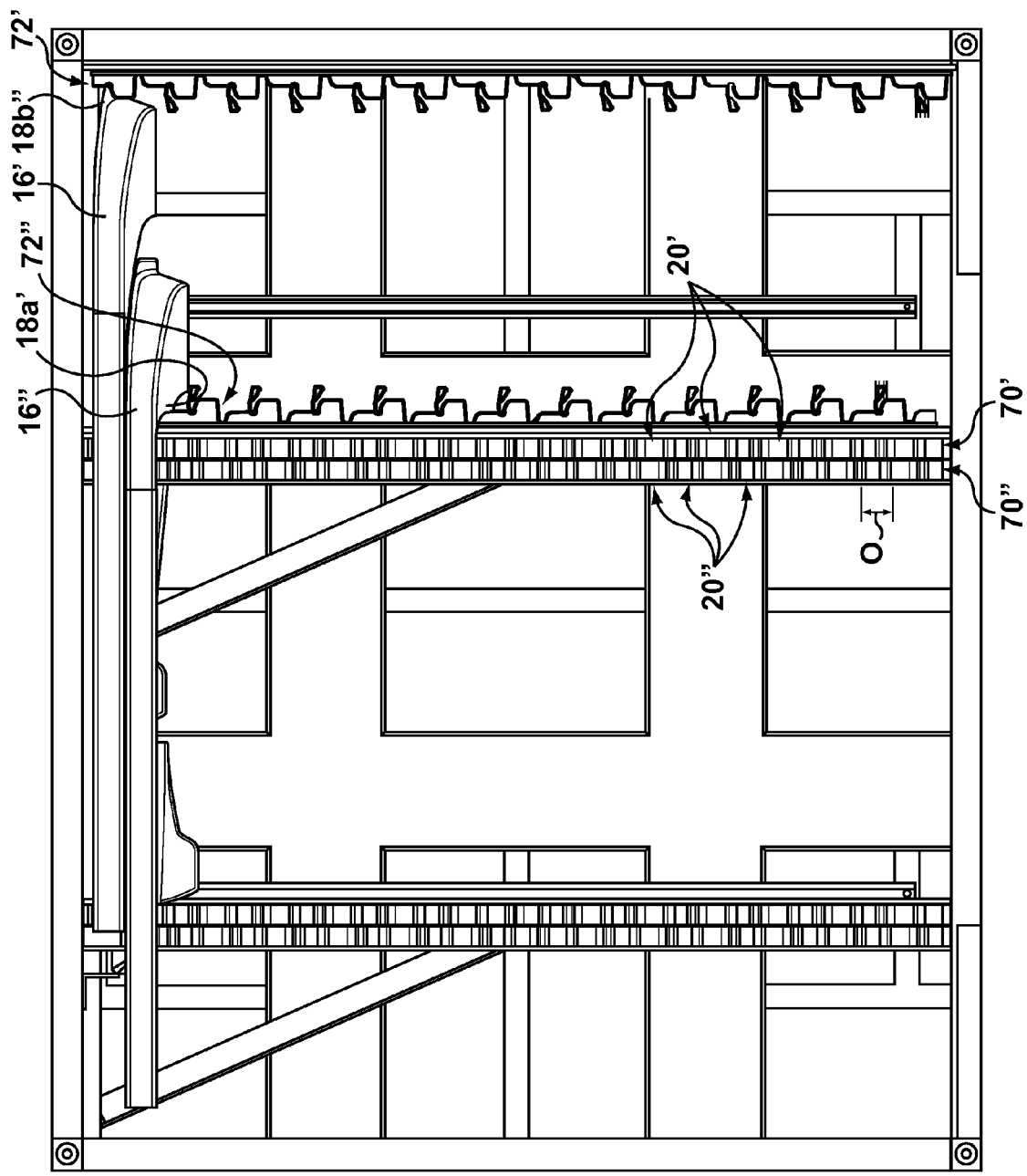
FIG. 11 is a top view of a rack holding two parts in a staggered formation according to yet another embodiment.
Figure 12:
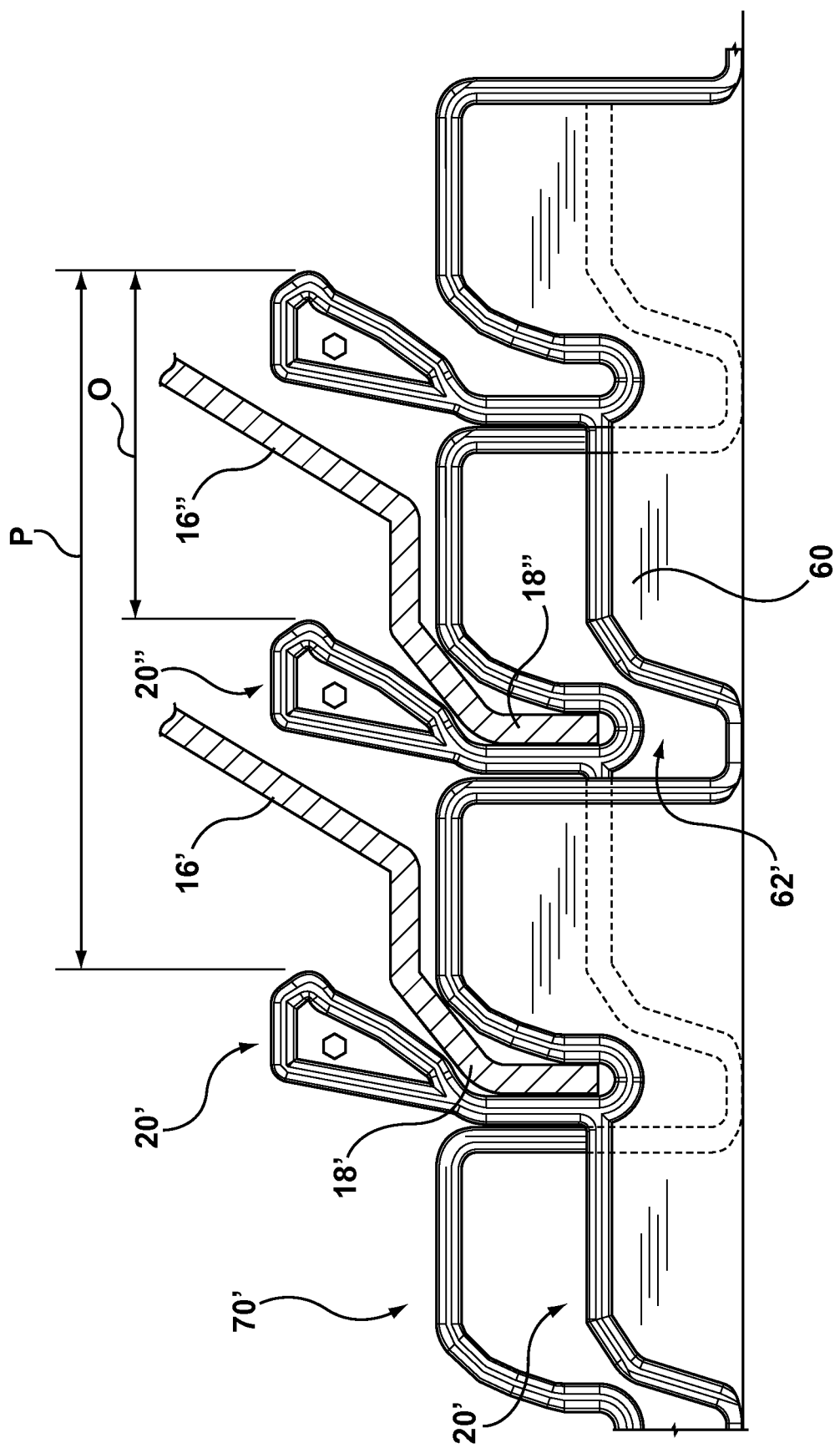
FIG. 12 is a close-up side view of two dunnage strips being offset for securing parts in a staggered formation according to yet another embodiment.
Figure 13:
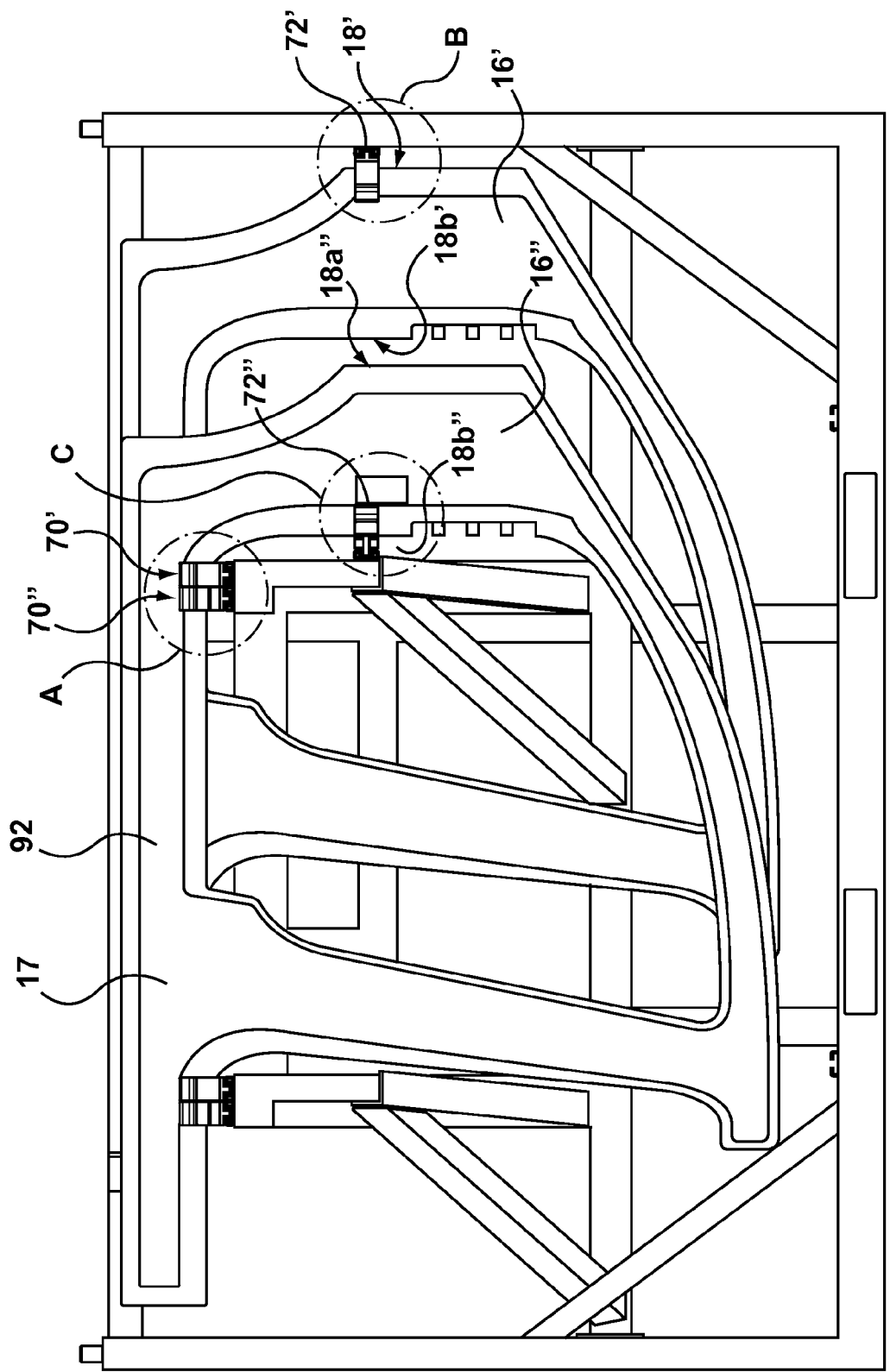
FIG. 13 is a front view of a rack holding two parts in a staggered formation according to yet another embodiment.

Turning now to FIGS. 11, 12 and 13, in some cases, the parts being held on a rack may have features that extend outward and increase the width or thickness of the part, which may limit the minimum clearance between parts when stacking parts in a single row. For example, the part may have features such as tabs or brackets that increases the width of the part in one particular spot.

Accordingly, to accommodate such features (e.g. tabs, brackets, etc.) the parts may be staggered within two or more offset rows on the rack 10, as shown in FIGS. 10, 11 and 12. Staggering the parts may increase the packing density, by allowing the parts to be more closely nested and increasing the space occupied by the parts in a rack, or in a particular truck transporting the parts.

In some embodiments, to stagger the parts, the rack 10 may include two dunnage strips 70', 70" positioned such that the clips 20' of a first dunnage strip 70' are longitudinally offset from clips 20" of a second dunnage strip 70" by a distance O (shown in FIG. 12).

Generally, the offset O may be approximately equal to one half the pitch P between adjacent clips 20 on the dunnage strips.

Alternatively, the offset O may a different value, for example, depending on the size and orientation of the parts, or the locations of the dunnage strips 70', or 70".

In some embodiments, two or more dunnage strips 70', 70" may be positioned transversely adjacent to each other on the rack 10, as shown in position A in FIG. 13. Positioning the dunnage strips 70', 70" is this manner tends to allow the clip 20' of the first dunnage strip 70' to hold a flange 18' of a first part 16', and the clip 20" of the second dunnage strip 70" to hold a flange 18" of a second part 16".

Furthermore, the offset O may be used to align the flange 18" of the second part 16" with the recessed portion 62' in the first dunnage strip 70'. Although not shown, in some embodiments, it may be desirable to support the flange 18" of the second part" with the buttress 60' of the first dunnage strip 70'.

Alternatively, the dunnage strips may be transversely spaced apart from each other on the rack 10, as shown in with reference to dunnage strips 72', 72" in positions B and C in FIG. 13. The lateral spacing between the dunnage strips 72', 72" may depend on the lateral location of a flange 18 that is to be held within a particular clip 20. For example as shown in FIGS. 11 and 13, the clips of each dunnage strip 72', 72" may hold the parts using two different flanges 18a, 18b. Specifically, the first dunnage strip 72' may hold a first part 16' at its front flange 18a' and the second dunnage strip 72" may hold a second part 16" at its rear flange 18b".

Referring to FIG. 13, the location and orientation of dunnage strips may also help support the parts at different locations and/or in different types of motion. Specifically, dunnage strips 70', 70" help hang the parts 16', 16" vertically from the rack 10. Conversely, dunnage strips 72', 72" help support the parts 16', 16" in the horizontal plane, which may inhibit side-to-side motion of the parts 16', 16" transverse to the longitudinal axis X, or may inhibit or prevent the parts 16', 16" from swinging back and forth about the clips at position A.

Although not shown, the dunnage strips may generally be oriented in any position when holding parts. For example, the dunnage strips 14 may be oriented so that the clips 20 extend downward from the elongated base 19, allowing the parts 16 to be suspended below the clips 20 (e.g. due to gravity). This orientation can be particularly useful when parts are being fed on conveyance systems, such as in automotive assembly lines.

In particular, in some embodiments, the dunnage strips may be used with a part accumulator on an overhead conveyor such that individual parts are attached to the accumulator using the dunnage strips. Similarly, individual parts may be attached to the accumulator using a rack fitted with one or more dunnage strips.

In other embodiments, a rack 10 having dunnage strips 14 that secure parts 16 thereto may be generally oriented in any orientation. For example, the rack 10 may be oriented on its side to facilitate transportation of the rack 10 within a shipping container.

Figure 14:
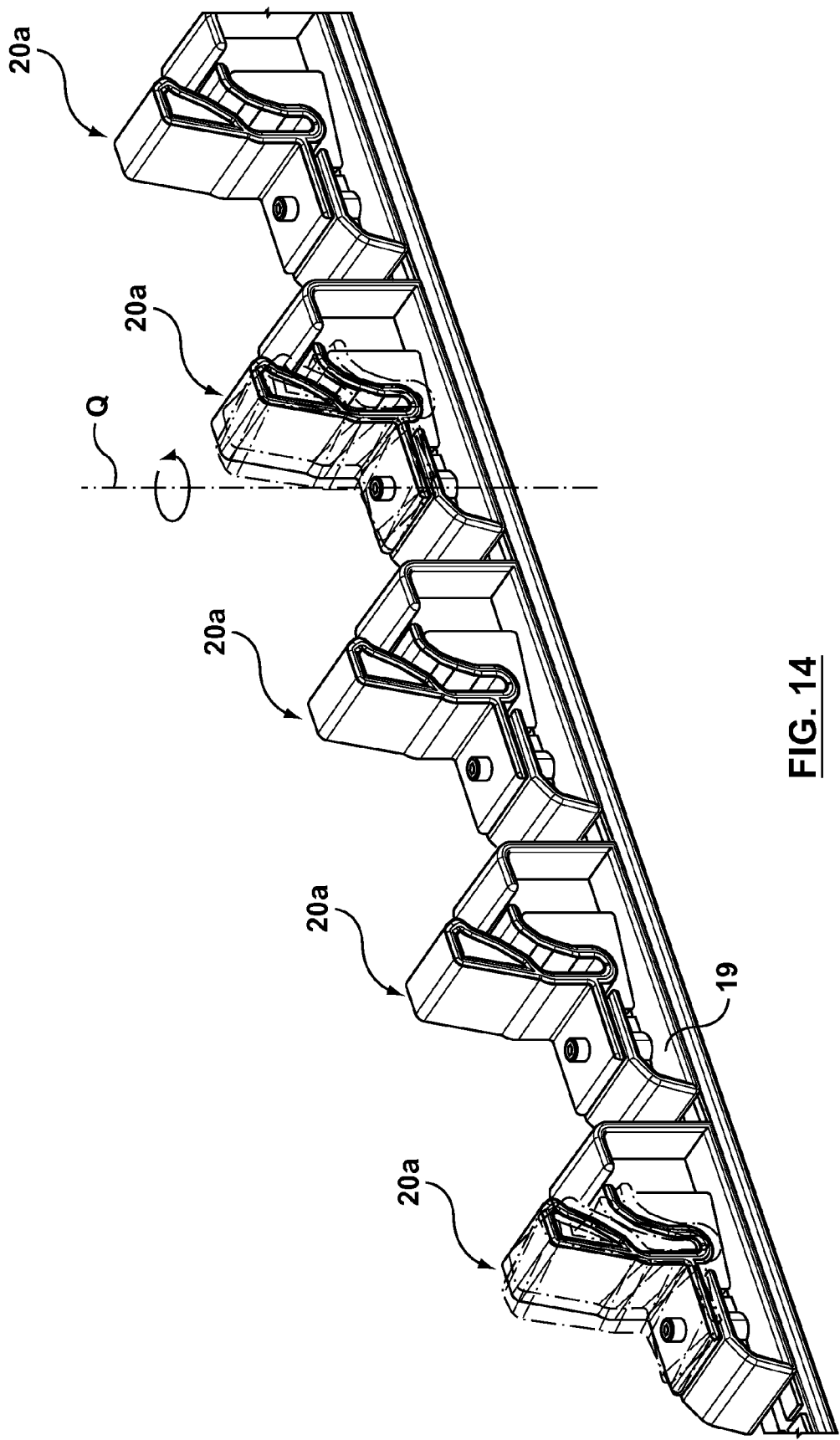
FIG. 14 is a front perspective view of a plurality of clips being pivotally mounted to a dunnage strip according to yet another embodiment.

When trying to achieve high packing density, it may be desirable to align the parts at various angles. For example, in some cases the parts may be aligned at approximately 45-degrees to the dunnage strip 14. In these cases, the clips 20 may be pivotally attached to the elongated base 19, for example using bolts or other fasteners, as shown in FIG. 14.

In the illustrated example, each clip 20a can be pivoted relative to the elongated base 19. For example, clip 20a may be pivoted about pivot axis Q by a predetermined amount up to and including 360-degrees. Alternatively, the clips 20a may be pivotally attached directly to the frame 12 without using a dunnage strip 14 or elongated base 19. For example, the clips 20 may be directly attached to the frame using bolts, weldments, or other suitable fasteners.

Figure 15:
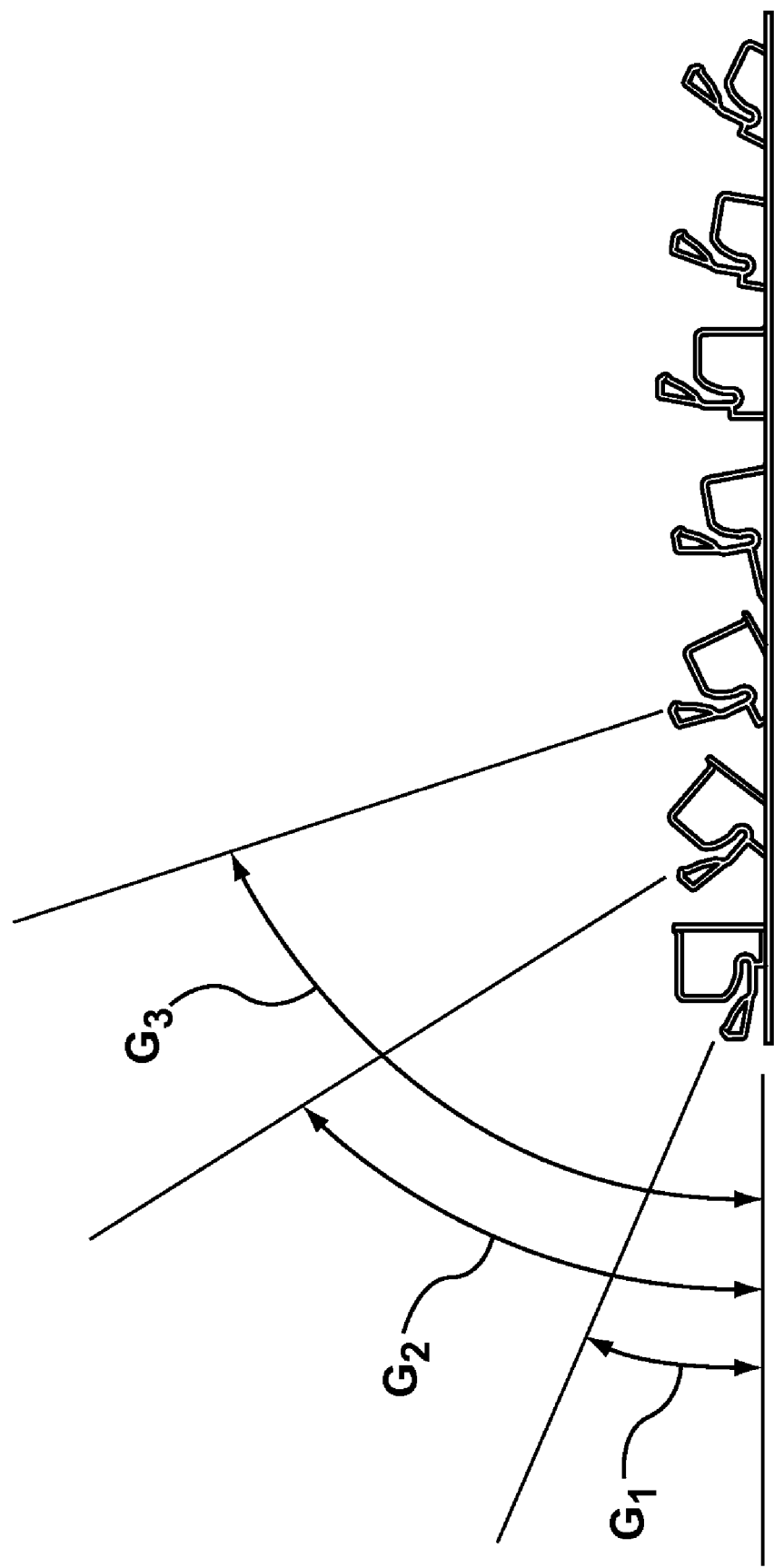
FIG. 15 is a side view of a plurality of clips being mounted in various angled positions relative to a dunnage strip according to yet another embodiment.

As shown in FIG. 15, one or more of the clips 20 may be inclined relative to the dunnage strip 14 at various angles. For example, the clips 20 may be inclined forwards or backwards at various angles G1, G2, and G3 with respect to the dunnage strip 14. In particular, as shown in this embodiment G1 is approximately 15-degrees, G2 is approximately 45-degrees, and G3 is approximately 60-degrees. Generally, the clips 20 may be inclined at any angle as desired.

To allow adjustment of the inclination or angle, the clips 20 may be pivotally mounted to the elongate base 19, for example on a pivot pin which can be locked in place at each of the various angles G1, G2, and G3. The inclination of the clips 20 relative to the dunnage strip 14 may allow parts to be held on the dunnage strip at various angles and orientations.

FIG. 16 illustrates a side view of a clip 120 according to an additional embodiment. Clip 120 is generally similar to clip 20 and similar elements are given similar reference numerals.

Clip 120 includes a resilient portion 150 modified to adjust the biasing resistance applied to the retaining arm 124. In particular, the resilient portion 150 as shown includes one or more slits 150a cut into the backside of the retaining arm 124. The number, size, and/or spacing of the slits 150a may be selected to adjust the biasing resistance, which may be set at a specific resistance for particular applications.

In other embodiments, the resilient portion 150 may be modified using corrugations, folds, etc. so as to adjust the biasing resistance.

Figure 17:
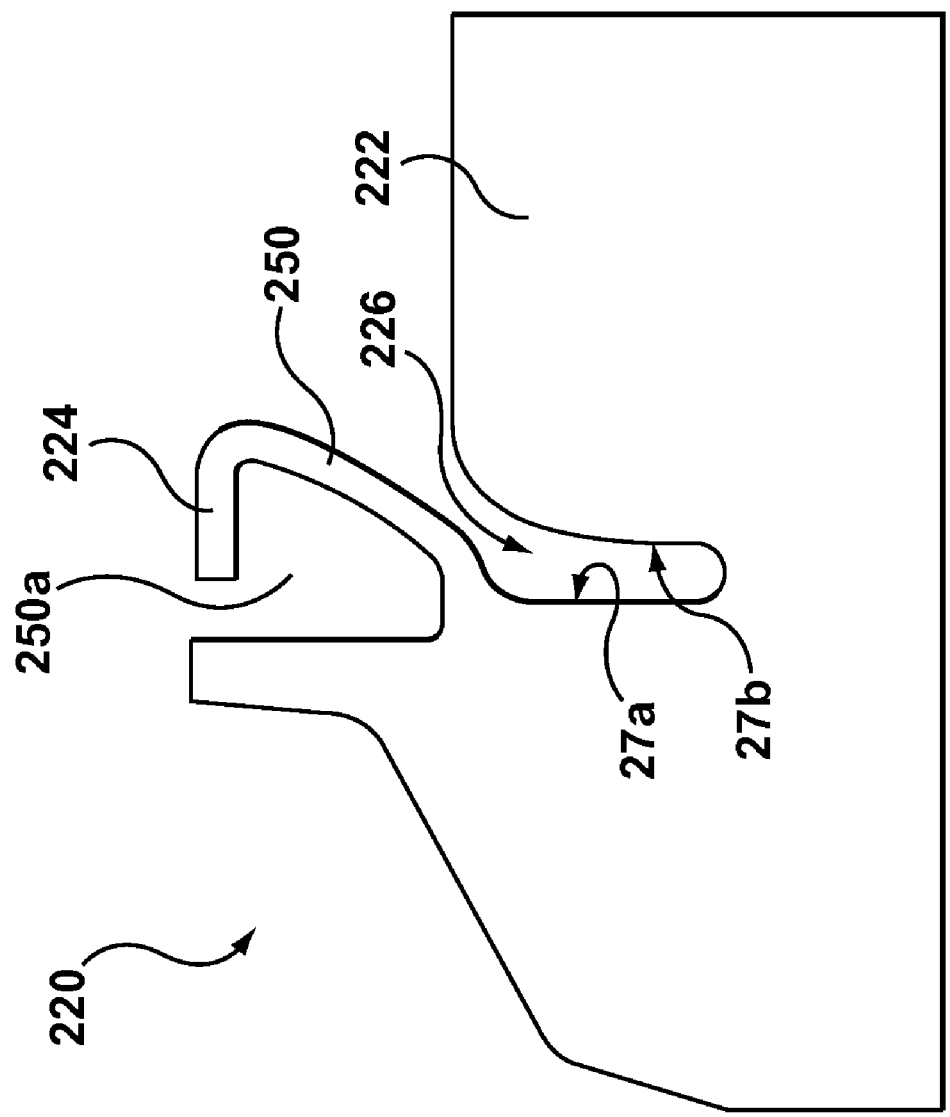
FIG. 17 is side view of a clip having a hollow gap in a retaining arm according to another embodiment.

FIG. 17 illustrates a side view of a clip 220 according to an additional embodiment. Clip 220 is generally similar to clip 20 and similar elements are given similar reference numerals (e.g. body 222, retaining arm 224, groove 226). The clip 220 also includes a resilient portion 250 that can be modified to adjust the biasing resistance applied to the retaining arm 224.

In particular, the retaining arm 224 defines a hollow gap 250a behind the resilient portion 250. The size of the hollow gap 250a and the thickness of the resilient portion 250 can be configured to adjust the biasing resistance (e.g. a thicker resilient portion 250 will increase the biasing resistance, and so on).

In the embodiments illustrated in FIGS. 16 and 17, the biasing resistance applied by the resilient portion 150, 250 can also be adjusted by changing the material of manufacture for the clip. Furthermore, the biasing resistance can be adjusted by performing any combination of the methods described herein, which may affect the ability of the retaining arm to hold a portion of a part within the groove, or the ability of the retaining arm to move to the open position.

Another difference between clip 220 and clip 20 is that the body 222 wholly defines the groove 226, whereas the clip 20 utilizes both the body 22 and the retaining arm 24 to define the groove 26.

Figure 18:
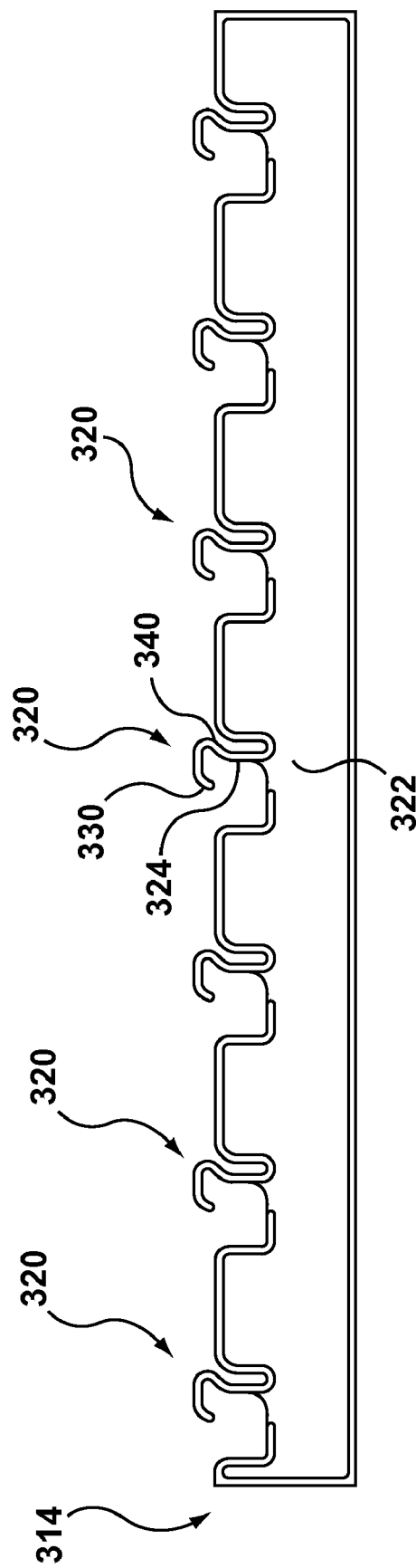
FIG. 18 is a side view of a dunnage strip including a plurality of clips with retaining arms shaped to engage a part in the locked position according to yet another embodiment.

FIG. 18 illustrates a side view of a dunnage strip 314 including a plurality of clips 320 according to an additional embodiment. Clip 320 is generally similar to clip 20 and similar elements are given similar reference numerals (e.g. body 322, retaining arm 324).

One difference is that the retaining arms 324 each have a generally constant thickness in comparison to the retaining arms 24 of clip 20 (which have an increased thickness toward the distal end 30 that defines the engaging portion 40, as discussed above). Since the retaining arm 324 has a constant thickness, the retaining arm 324 is generally bent to define the engaging portion 340. Furthermore, the engaging portion 340 is located between the body 322 and the distal end 330 of the retaining arm.

Figure 19:
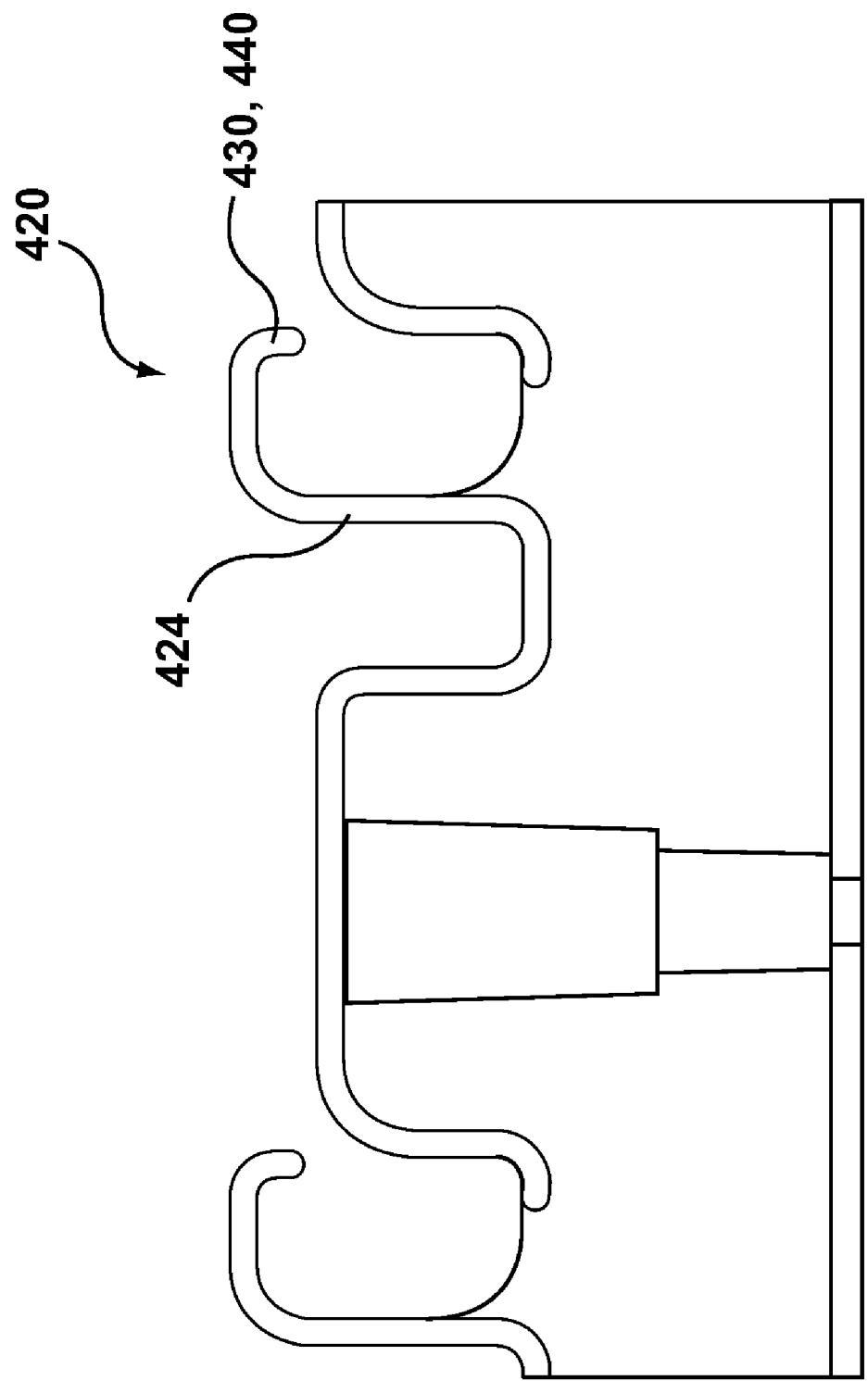
FIG. 19 is a side view of clip with a retaining arm shaped such that the distal end of the retaining arm engages a part in the locked position according to yet another embodiment.

FIG. 19 illustrates a side view of a clip 420 according to an additional embodiment. Clip 320 is generally similar to clip 20 and similar elements are given similar reference numerals. Like clip 320, clip 420 includes a retaining arm 424 that has a generally constant thickness, and that is bent to define the engaging portion 440. In particular, the retaining arm 424 of clip 420 is bent so that the distal end 430 of the retaining arm defines the engaging portion 440.

Figure 20:
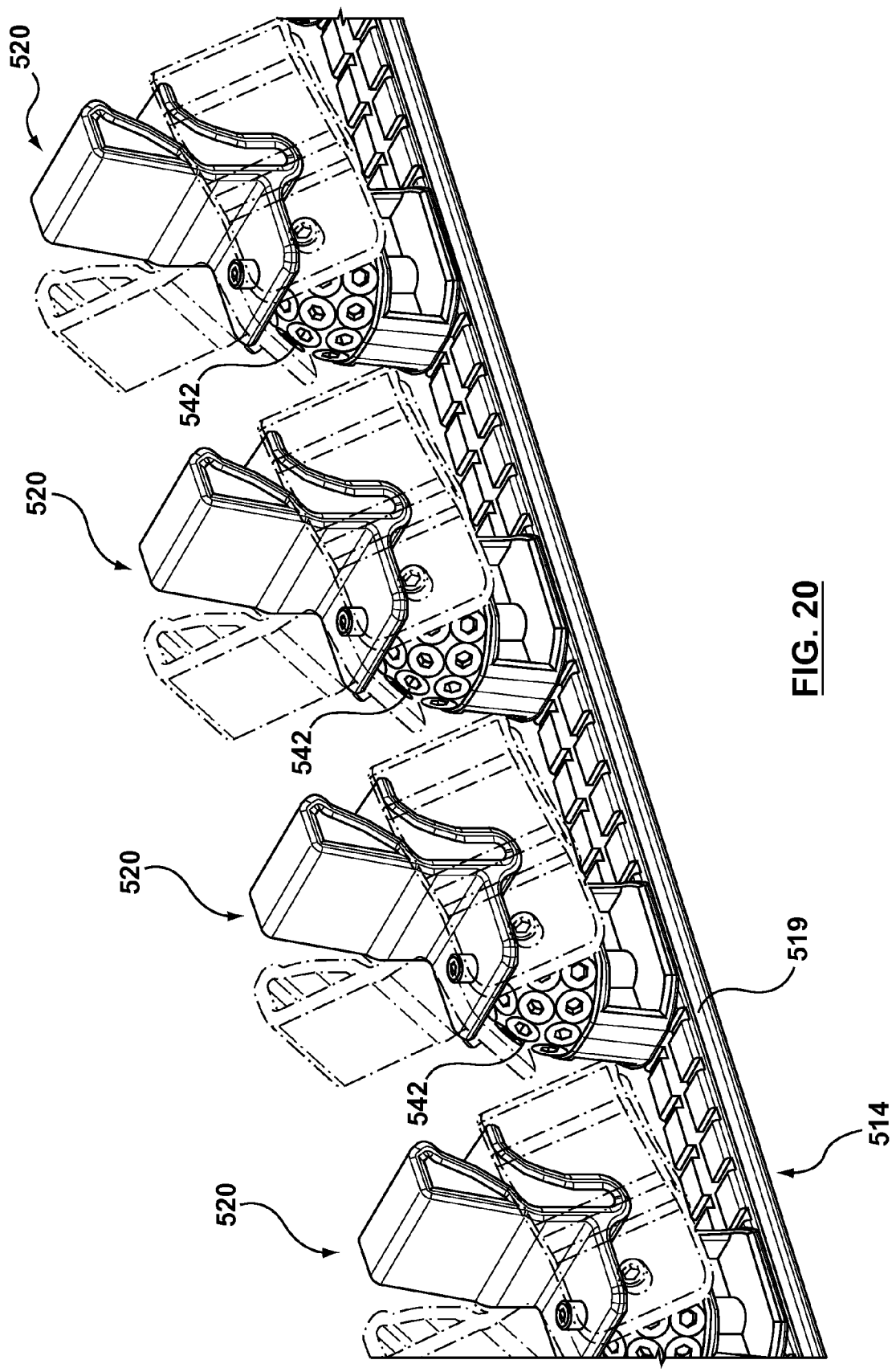
FIG. 20 is a front perspective view of a dunnage strip including a plurality of clips that can be reoriented in three-dimensions according to yet another embodiment.
Figure 21:
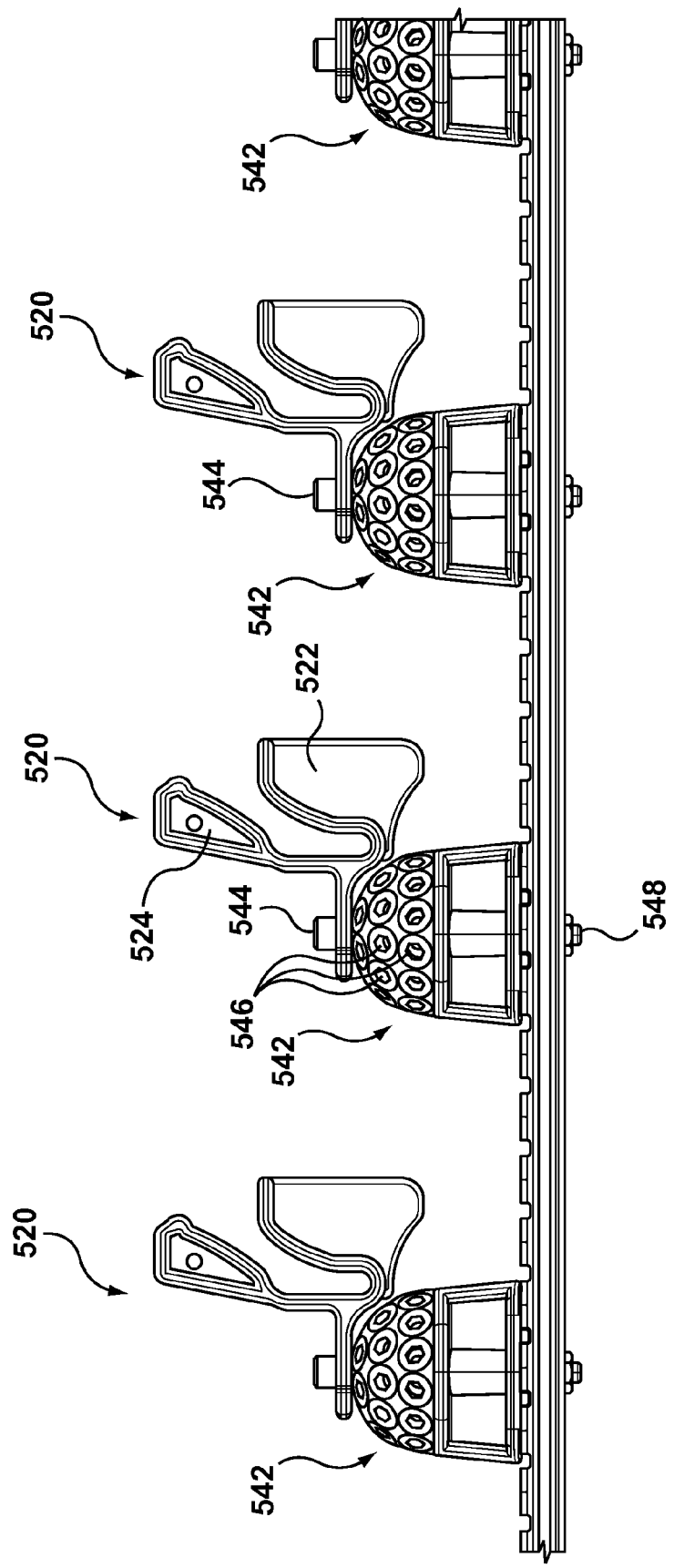
FIG. 21 is a side view of the dunnage strip of FIG. 20.

FIGS. 20 and 21 illustrate a dunnage strip 514 according to an additional embodiment. Dunnage strip 514 is generally similar to dunnage strip 14 and similar elements are given similar reference numerals.

The dunnage strip 514 includes a series of clips 520 attachable to an elongated base 519 using clip receivers 542. Each clip includes a body 522 and a retaining arm 524 coupled to the body 522. The body 522 of the clip 520 is attachable to a surface of the clip receiver 542 (which may be hemispherical as shown, or may have any other suitable surface topology) using a fastener 544. As shown, the fastener 544 may be a bolt that threads into one of a plurality of threaded apertures 546 located on the surface of the clip receiver 542.

Attaching the body 522 of each clip 522 to different threaded apertures 546 tends to allow for three-dimensional reorientation of the 520 relative to the elongated base 519. Furthermore, in some cases each clip 520 can be pivoted about the fastener 544 prior to attachment to provide more three-dimensional reorientations of the clip 520 relative to the elongated base 519.

Further still, the clip receiver 542 may be attachable to the elongated base 519 using a fastener 548 (such as a bolt, screw, etc.), which tends to allows the receiver 542 to pivot about the elongated base 519 to provide additional three-dimensional reorientations of the clip 520 relative to the elongated base

519. The fastener 548 may also allows the receiver 542 and clip 520 to be attached at various positions along the length of the elongated base 519.

Generally, the configuration and modularity of the dunnage strip 514 tends to allow reorientation and repositioning of a variety of different parts for a variety of different applications, and in some cases allowing the parts to have an out of "normal" position. For example, the dunnage strip 514 may be reconfigured in a variety of different setups to maximize the packing density of a variety of different parts within a variety of different racks.

Figure 22:
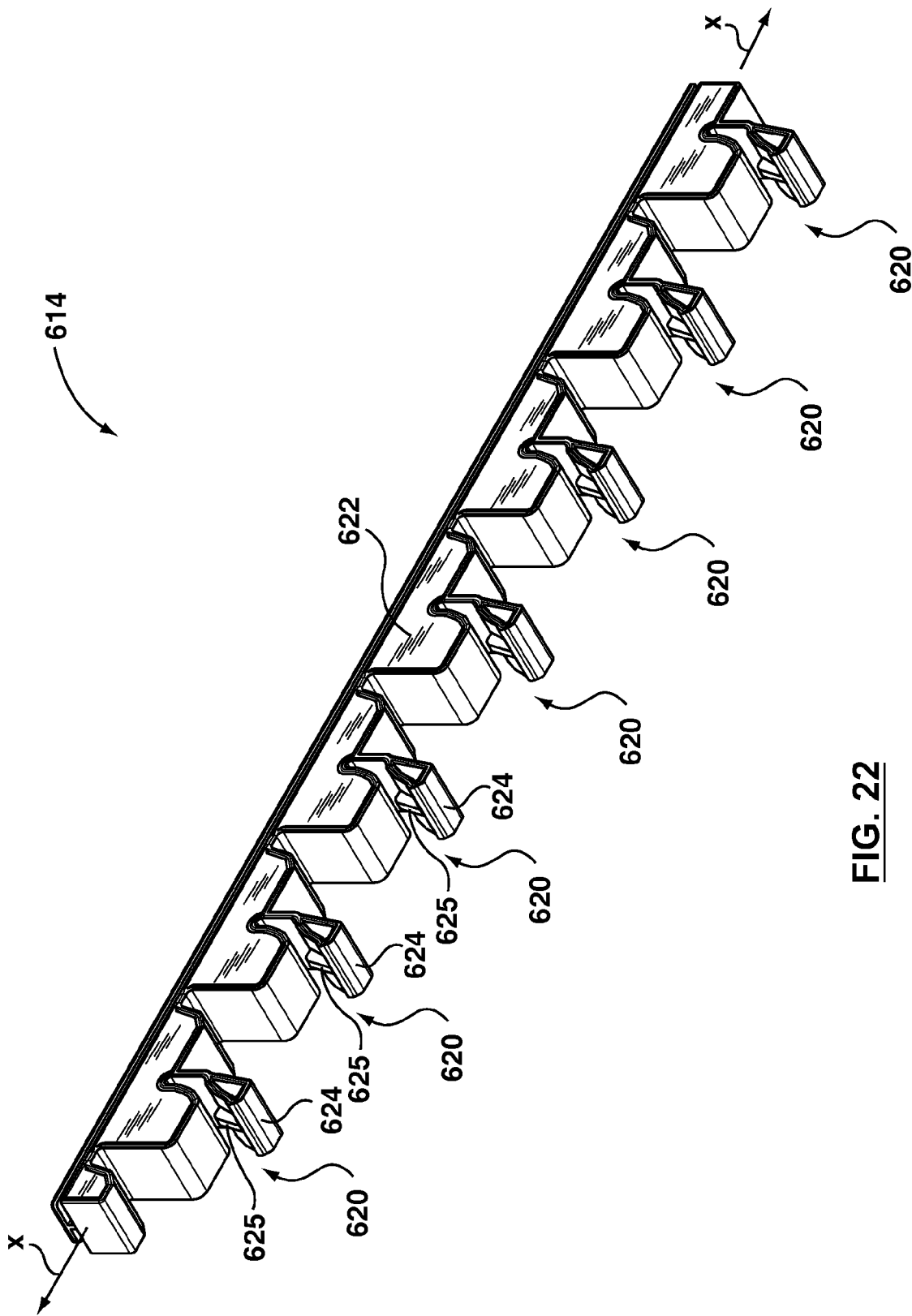
FIG. 22 is a perspective view of a dunnage strip according to another embodiment.
Figure 24:
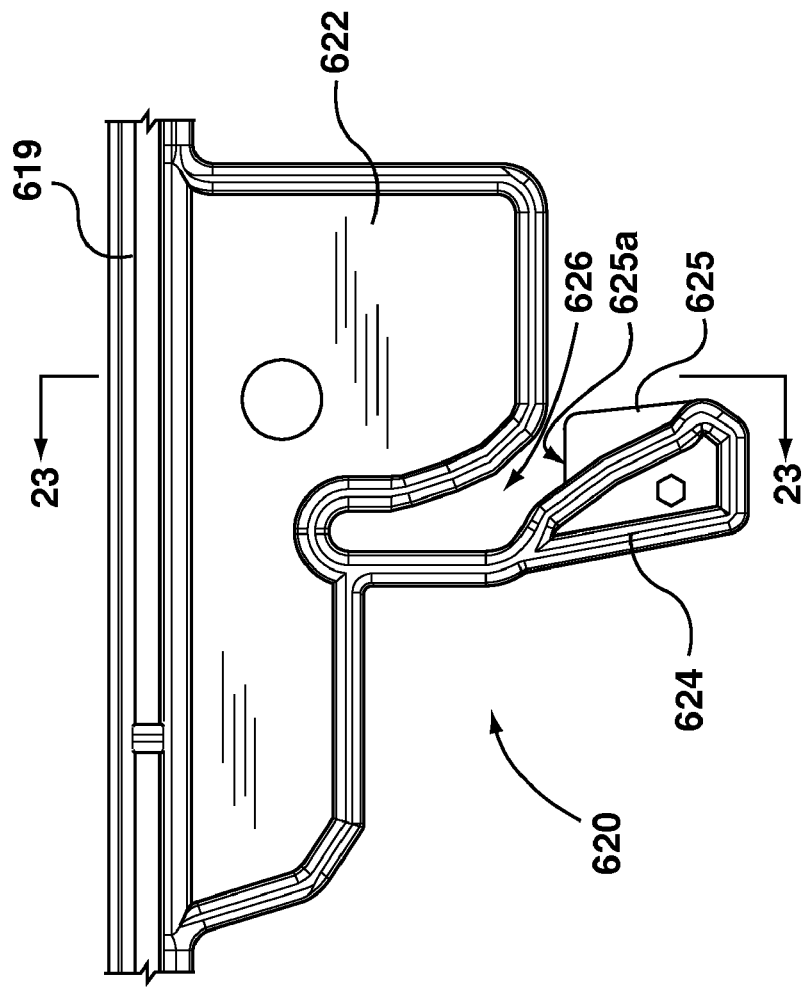
FIG. 24 is a side view of a clip of the dunnage strip of FIG. 22.
Figure 23:
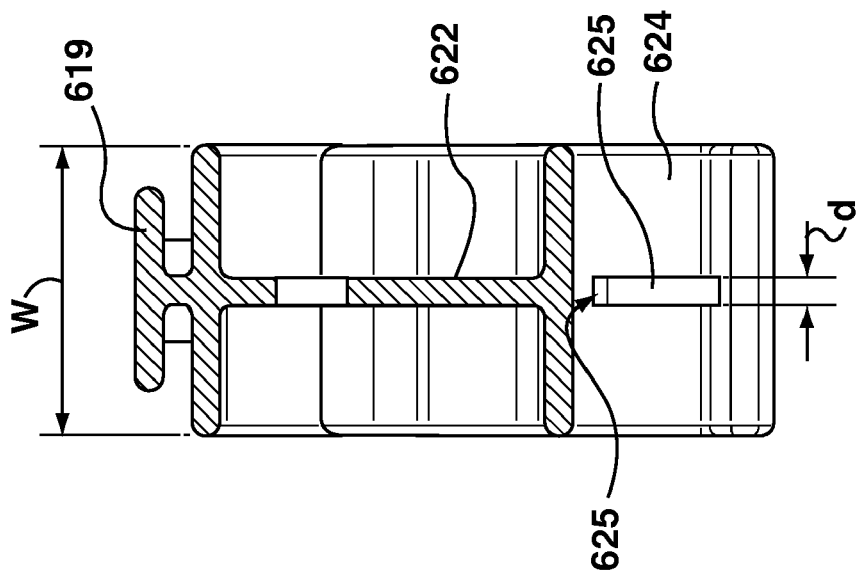
FIG. 23 is a cross-sectional end view of a clip of the dunnage strip of FIG. 22.

Turning now to FIGS. 22 to 24, illustrated therein is a dunnage strip 614 according to another embodiment. Dunnage strip 614 is generally similar to dunnage strip 14, and similar elements are given similar reference numerals. For example, the dunnage strip 614 has an elongated base 619 that extends along a longitudinal axis X, and has a series of clips 620 coupled to or provided on the elongated base 619.

Each clip 620 generally includes a body 622 coupled to or provided on the elongated base 619, and a retaining arm 624 extending outwardly from the body 622 away from the base 619. Each clip 620 generally has a groove 626 therein for receiving a portion (e.g. the flange 18) of a part 16.

In this embodiment each clip 620 may also include one or more locking tabs 625 or "noses". For example, as shown a single locking tab 625 protrudes outwardly from the engaging surface of the retaining arm 624 (in this embodiment generally in the middle of the retaining arm 624) and further overhangs the groove 626. In other embodiments, two or more locking tabs 625 may be provided, and may located at various locations on the engaging surface (e.g. with one locking tab 625 adjacent each of the opposite edges of the arm 624, etc.)

The locking tab 625 tends to further assist in securing the flange 18 or another portion of the part 16 within the groove 626. In particular, the locking tab 625 may further increase the contact pressure between the retaining arm 624 and the part and acting as a strengthening and/or stabilizing feature. This may be especially useful for example when the part 16 is suspended or hanging below the clip 620 (for example, as shown in FIGS. 22 to 24, the dunnage strip 614 is oriented so that the retaining arm 624 is below the groove 626).

In some embodiments, the locking tab 625 may be a narrow member with a width 'd' generally substantially less that the width W of the dunnage strip 614 such that the locking tab 625 generally tends not to substantially interfere with the loading or unloading of the part 16.

In some embodiments, the width 'd' of the locking tab is less than 2 centimeters. In some embodiments, the width 'd' of the locking tab is less than 1 centimetre. In some embodiments, the width 'd' of the locking tab is less than 0.5 centimeters. In some embodiments, the width 'd' of the locking tab is about 0.4 centimeters.

As shown, the locking tab 625 may include a generally flattened supporting region 625a such that the part 16 tends to be more securely restrained by the retaining arm 624. In this manner, parts 16 can be suspended or "hung" from the dunnage strip 614 with the locking tab 625 engaged against the flange 18 or another portion of the part 16 in a secure manner.

While some of the previous examples of dunnage strips and clips have described supporting a part by holding a flange within a groove, the teachings herein may be applied to other portions of a part. For example, in some embodiments the clip may engage and secure a tab, seam, or another type of edge or feature that can be held within a groove.

One particular application of the dunnage strips and clips described herein is supporting an automotive body panel by a welding flange on that panel. This application is beneficial because welding flanges are common to many automotive parts, such as door rings or panels or other body panels.

Furthermore, welding flanges typically have a standard or similar size. Accordingly, the same or a similar clip configuration can be reused for a variety of different automotive panels or different shapes and sizes where they have similar welding flanges. This reusability can help reduce the cost of developing new dunnage strips for each automotive panel.

When using the dunnage strips described herein, one orientation that may be beneficial for supporting door rings or panels and similar parts is a "sill down" orientation, where the door ring 17 hangs from the clip by a flange on a sill 92 of the door ring 17 as shown in FIGS. 1 and 12. The reason the "sill down" orientation is beneficial is because the sill is a common element to many door rings or panels (e.g. the sill 92 may have the same linear shape), and holding the door ring 17 from the flange on the sill 92 allows the same dunnage strip to be used for multiple door rings.

While the above description provides examples of one or more methods and/or apparatuses, it will be appreciated that other methods and/or apparatuses may be within the scope of the present description as interpreted by one of skill in the art.

I claim:

1. A clip for securing a part, comprising:
   a. a body portion having a first wall surface and a supporting surface adjacent the first wall surface;
   b. a retaining arm connected to the body portion, the retaining arm extending outwardly from the body portion and located opposite of the supporting surface, the retaining arm comprising:
      i. a second wall surface opposite the first wall surface,
      ii. a distal end extending outwardly from the second wall surface beyond the support surface,
      iii. an engaging portion on the distal end of the retaining arm, and
      iv. an engaging surface on the engaging portion generally opposite the supporting surface;
   c. wherein the first and second wall surfaces cooperate to define a groove that is sized and shaped to receive a portion of the part therein; and
   d. wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

2. The clip of claim 1, wherein the retaining arm is biased toward the locked position.

3. The clip of claim 1, wherein, the second wall surface defines a groove plane, and the engaging surface defines an engaging plane, the engaging plane angularly offset from the groove plane by a first angle.

4. The clip of claim 3, wherein the first angle is between 0 and 45 degrees.

5. The clip of claim 1, wherein the engaging surface and the supporting surface are generally complementary.

6. The clip of claim 1, wherein the body portion has a width, and the groove extends through at least a portion of the width.

7. The clip of claim 6, wherein the width is between 0.1 and 10 centimeters.

8. The clip of claim 6, wherein the groove extends across the entire width.

9. The clip of claim 1, wherein the first and second wall surfaces are at least partially parallel and are spaced apart by a groove width, wherein the groove width is selected to correspond to a thickness of the portion of the part to be received in the groove.

10. The clip of claim 9, wherein the groove width is between 0.1 and 3.0 centimeters.

11. The clip of claim 1, wherein the body portion further comprises a buttress portion generally on an opposite side of the retaining arm as the supporting surface of the body portion, the buttress portion sized and shaped for supporting a second portion of a second part.

12. The clip of claim 1, wherein the portion of the part is a flange, and the groove is sized and shaped to correspond to a thickness of the flange.

13. The clip of claim 1, wherein the retaining arm is integral with the body portion.

14. The clip of claim 1, further comprising a nib that extends outwardly from the engaging portion, the nib sized and shaped for contacting the part and urging the retaining arm toward the open position when the part is inserted into the clip.

15. The clip of claim 1, wherein the retaining arm comprises a resilient portion that biases the retaining arm towards the locked position.

16. The clip of claim 15, wherein the resilient portion comprises a plurality of slits formed in the retaining arm.

17. The clip of claim 1, wherein at least a portion of the first and second opposing wall surfaces include a resiliently deformable material configured to apply a biasing force against the portion of the part when received in the groove.

18. The clip of claim 1 wherein the body portion is configured to be connected directly to a rack for carrying the part.

19. The clip of claim 1, further comprising at least one locking tab extending outwardly from the engaging surface.

20. The clip of claim 19, wherein each locking tab has a width that is substantially less that a width of the retaining arm.

21. A dunnage strip for securing one or more parts, the dunnage strip comprising:
 a. an elongate base extending along a longitudinal axis;
 b. at least one clip connected to the base, each clip having:
  i. a body portion having a first wall surface and a supporting surface adjacent the first wall surface;
  ii. a retaining arm connected to the body portion, the retaining arm extending outwardly from the body portion and located opposite of the supporting surface, the retaining arm comprising:
   (1) a second wall surface opposite the first wall surface,
   (2) a distal end extending outwardly from the second wall surface beyond the support surface,
   (3) an engaging portion on the distal end of the retaining arm, and
   (4) an engaging surface on the engaging portion generally opposite the supporting surface;
  iii. wherein the first and second wall surfaces cooperate to define a groove that is sized and shaped to receive a portion of the one or more parts therein; and
  iv. wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

22. The dunnage strip of claim 21, wherein at least one clip of the at least one clip is configured to pivotally rotate about a pivot axis with respect to the elongate base.

23. The dunnage strip of claim 21, wherein at least one clip of the at least one clip is inclined at an angle relative to the elongate base.

24. The dunnage strip of claim 21, wherein at least one clip of the at least one clip is coupled to the dunnage strip using at least one clip receiver.

25. The dunnage strip of claim 24, wherein the at least one clip receiver comprises a plurality of attachment points spaced about a surface thereof.

26. A rack for holding parts, the rack comprising:
 a. a frame;
 b. at least one dunnage strip coupled to the frame, each dunnage strip comprising an elongate body and having at least one clip connected thereto;
 c. each clip comprising:
  i. a body portion having a first wall surface and a supporting surface adjacent the first wall surface;
  ii. a retaining arm connected to the body portion, the retaining arm extending outwardly from the body portion and located opposite of the supporting surface, the retaining arm comprising:
   (1) a second wall surface opposite the first wall surface,
   (2) a distal end extending outwardly from the second wall surface beyond the support surface,
   (3) an engaging portion on the distal end of the retaining arm, and
   (4) an engaging surface on the engaging portion generally opposite the supporting surface;
  iii. wherein the first and second wall surfaces cooperate to define a groove that is sized and shaped to receive a portion of the part therein; and
  iv. wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

27. The rack of claim 26, wherein the at least one dunnage strip includes at least two dunnage strips that are offset so that a part held by a first one of the dunnage strips engages a buttress of at least one clip on a second one of the dunnage strips.

28. A clip for securing a part, comprising:
 a. a body portion having a first wall surface, a second wall surface opposite the first wall surface, and a supporting surface adjacent the first wall surface;
 b. a retaining arm connected to the body portion, the retaining arm extending outwardly from the body portion and located opposite of the supporting surface, the retaining arm comprising:
  i. a distal end extending outwardly from the second wall surface beyond the support surface,
  ii. an engaging portion at a distal end of the retaining arm, and
  iii. an engaging surface on the engaging portion generally opposite the supporting surface;

c. wherein the first and second wall surfaces cooperate to define a groove that is sized and shaped to receive a portion of the part therein; and
d. wherein the retaining arm is moveable between an open position wherein the portion of the part may be received in the groove, and a locked position wherein the engaging surface at least partially overhangs the groove and the engaging surface and the supporting surface cooperate so as to retain the portion of the part when received within the groove.

* * * * *